(12) United States Patent
Piasecki et al.

(10) Patent No.: US 10,940,953 B1
(45) Date of Patent: Mar. 9, 2021

(54) AIRCRAFT SELF-RESCUE SYSTEM

(71) Applicant: Piasecki Aircraft Corporation, Essington, PA (US)

(72) Inventors: John W. Piasecki, Bryn Mawr, PA (US); Frederick W. Piasecki, Haverford, PA (US)

(*) Notice: Subject to any disclaimer, the term of this patent is extended or adjusted under 35 U.S.C. 154(b) by 620 days.

(21) Appl. No.: 15/709,235

(22) Filed: Sep. 19, 2017

Related U.S. Application Data

(60) Provisional application No. 62/397,229, filed on Sep. 20, 2016.

(51) Int. Cl.
*B64D 33/02* (2006.01)
*B64D 17/80* (2006.01)
*B64D 25/00* (2006.01)
*B64C 39/02* (2006.01)

(52) U.S. Cl.
CPC ............ *B64D 17/80* (2013.01); *B64C 39/024* (2013.01); *B64D 25/00* (2013.01); *B64C 2201/107* (2013.01); *B64C 2201/146* (2013.01); *B64C 2201/185* (2013.01)

(58) Field of Classification Search
CPC ... B64D 17/80; B64C 25/00; B64C 2201/107; B64C 2201/185
See application file for complete search history.

(56) References Cited

U.S. PATENT DOCUMENTS

| | | | | |
|---|---|---|---|---|
| 3,395,881 A | * | 8/1968 | Ferguson | B64D 17/00 244/139 |
| 4,108,402 A | * | 8/1978 | Bowen | B64D 17/80 244/102 R |
| 4,113,208 A | * | 9/1978 | Manfredi | B64D 17/80 244/139 |
| 5,810,293 A | * | 9/1998 | Leeki-Woo | B64D 25/12 244/139 |
| 6,808,144 B1 | * | 10/2004 | Nicolai | B64C 39/024 244/139 |
| 8,967,526 B2 | * | 3/2015 | Karem | B64C 1/00 244/36 |
| 9,221,532 B2 | * | 12/2015 | Karem | B64C 1/0009 |
| 9,493,226 B2 | * | 11/2016 | Karem | B64C 39/10 |
| 2003/0025038 A1 | * | 2/2003 | Nicolai | B64C 39/024 244/152 |
| 2011/0315806 A1 | * | 12/2011 | Piasecki | B64C 27/32 244/2 |
| 2012/0248258 A1 | * | 10/2012 | Harber | B64D 17/34 244/35 R |
| 2012/0292435 A1 | * | 11/2012 | Karem | B64C 1/00 244/36 |
| 2016/0075423 A1 | * | 3/2016 | Karem | B64C 39/10 244/36 |

(Continued)

*Primary Examiner* — Philip J Bonzell
(74) *Attorney, Agent, or Firm* — Robert J. Yarbrough; Lipton, Weinberger & Husick

(57) ABSTRACT

The Invention is a self-rescue system for an aircraft. The aircraft may be a flight module, a mission module, or a combined flight module and mission module of a modular and morphable air vehicle, or may be any other aircraft. The self-rescue system is modular and interchangeable and provides selectable capability to protect the flight module, the mission module, and any crew or cargo of the mission module in the event that the flight module or mission module suffers mishap or system failure during flight.

23 Claims, 19 Drawing Sheets

(56) References Cited

U.S. PATENT DOCUMENTS

| | | | |
|---|---|---|---|
| 2017/0066532 A1* | 3/2017 | Karem | B64C 1/0009 |
| 2017/0361929 A1* | 12/2017 | Demonfort | B64C 39/026 |
| 2018/0002016 A1* | 1/2018 | McCullough | B64C 29/02 |
| 2018/0009540 A1* | 1/2018 | Robertson | B64D 17/80 |
| 2018/0011487 A1* | 1/2018 | Robertson | G05D 1/0061 |

\* cited by examiner

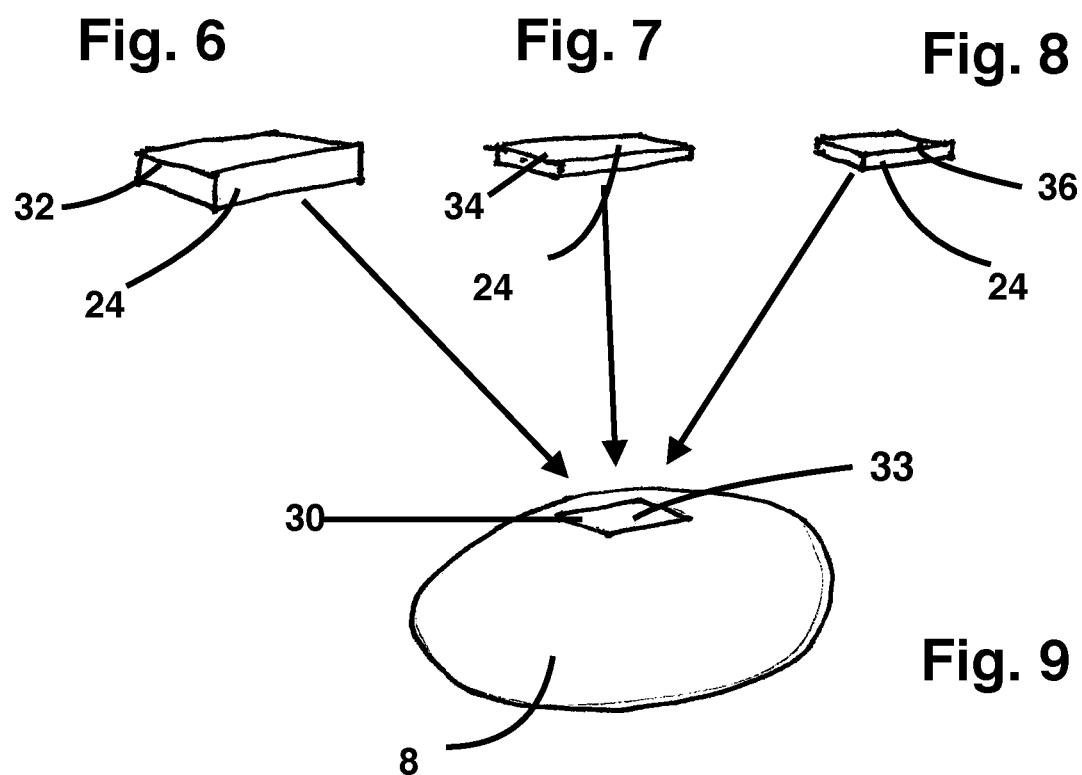

9

AIRCRAFT SELF-RESCUE SYSTEM

I. RELATED APPLICATION

This application is entitled to priority from U.S. Provisional Application 62/972,229 filed Sep. 20, 2016, which is hereby incorporated by reference as if set forth in full herein.

II. BACKGROUND OF THE INVENTION

A. Field of the Invention

The Invention is a self-rescue system for an aircraft. The aircraft may be a flight module, a mission module, or a combined flight module and mission module of a modular and morphable air vehicle as taught by the documents incorporated by reference. Alternatively, the aircraft may be any other aircraft. The self-rescue systems are interchangeable and provide selectable capability to protect the flight module, mission module and any crew or cargo of the mission module in the event that the flight module or mission module suffers mishap or system failure during flight. The self-rescue systems also may be modular and may be composed of a plurality of sub-modules of components.

B. Statement of the Related Art

U.S. Provisional Patent Application 61/345,535, filed May 17, 2010 by John W. Piasecki and others and U.S. Provisional Patent Application No. 61/416,965 filed Nov. 24, 2010 by John W. Piasecki and others are hereby incorporated by reference in this document as if set forth in full herein. U.S. utility patent application Ser. No. 13/068,601 filed May 16, 2011 by John W. Piasecki and others and U.S. Pat. No. 9,045,226 to the same inventors issued Jun. 2, 2015 are incorporated by reference in this document as if set forth in full herein. U.S. Pat. No. 9,393,847 issued Jul. 19, 2016 and U.S. Pat. No. 9,610,817 issued Apr. 4, 2017 also are hereby incorporated by reference as if set forth in full herein.

The patents incorporated by reference teach an unmanned flight module that may fly autonomously or under human control. The flight module is referred to as an 'air module' in the documents incorporated by reference. The unmanned flight module may be selectably attached to any of a number of different mission modules, referred to as a 'ground module' in the documents incorporated by reference. The mission module may be a wheeled vehicle, a medical module, a cargo module, a passenger module, a weapons module, or any of the other mission modules described in the patents incorporated by reference. The documents incorporated by reference teach different embodiments of the flight module, including a flight module embodiment that is supported in flight by two ducted fans that tilt between a low-speed position and a high-speed position. In the high-speed position, the ducts of the ducted fans act as circular wings to provide lift to the flight module.

III. BRIEF DESCRIPTION OF THE INVENTION

The Invention is a self-rescue system for an aircraft. The self-rescue system of the Invention may be used for any aircraft and for example may be used for the modular and morphable air vehicle described in the documents incorporated by reference. The remainder of this application discusses the self-rescue system in the context of a flight module having two ducted fans as described in the documents incorporated by reference, but the description applies equally to any other aircraft. The flight module and also may include an attached mission module. The invention may have application to any embodiment of the flight module as described in the documents incorporated by reference.

A failure mode of the flight module or flight module/mission module combination may be damage or a system failure that prevents the flight module from supporting the mission module in flight. The self-rescue system is intended to protect the mission module and its passengers or cargo from damage due to a failure or damage to the flight module. The self-rescue systems also may protect the flight module and may protect the combination of the attached flight and mission modules. In some circumstances, the self-rescue system may protect the flight module from damage due to the failure of the mission module; for example, in the event of an uncontrolled fire in the mission module.

A. Separate Systems

The combination of the flight module and mission module may have a single self-rescue system for both the joined flight and mission modules. Alternatively, the flight module and mission module are separable and each may have a separate self-rescue system and control system. Providing a separate self-rescue system for the mission module allows the mission module to avoid supporting the weight of the flight module during a hard landing, providing substantial weight savings for the rescue of the mission module.

B. Self-Rescue Systems are Interchangeable

The self-rescue systems may be interchangeable between the flight and mission modules and different interchangeable self-rescue systems may have different weights and capabilities. For example, a low-capability self-rescue system may be a simple mortar-launched parachute, while a high-capability self-rescue system may be a parafoil featuring a control system, a vectored parafoil launch system, control effectors, ailerons and an attached turbine engine and fuel supply for forward propulsion. A mission planner or the owner of the flight and mission module may select which of the interchangeable self-rescue systems to attach to the flight module, to the mission module, or to both the flight and mission modules. The mission planner or owner of the flight or mission module also may select whether to omit the self-rescue system from the flight or mission module. The selection and installation process for the self-rescue systems may be performed by a human support crew or may be automated.

Which of the multiple self-rescue systems is attached to a flight module or mission module depends upon the value placed upon the flight module or mission module or the cargo of the mission module and the tolerance of a particular mission for the weight and performance penalties associated with the different self-rescue systems. For example, the lives of the troops in a troop carrier mission module will have a high value, and hence a self-rescue system having high capabilities may be selected to protect the troops. The high-capability self-rescue module is heavier and bulkier than a low-capability self-rescue module. The high capability self-rescue module necessarily will reduce the performance and range of the flight module/mission module combination. For a particular mission, the reduction in capability may be acceptable, and so a high-capability self-rescue system may be selected. For a different mission, performance and range considerations may be critical and may dictate use of a lower-capability self-rescue system, or omission of the self-rescue system altogether from the flight module, the mission module, or both the flight and mission modules.

C. Self-Rescue System May be Modular

The self-rescue system may itself be modular, so that the capabilities of the self-rescue system may be tailored to the value of the flight module, mission module, or cargo and to the performance and range constraints. For example, the owner or operator of the flight module or mission module may select from among the following sub-modules of the self-rescue system:

1. parachute with drogue parachute launch;
2. parachute with mortar or rocket launch;
3. parafoil with mortar or rocket launch;
4. launch automation system with an attitude sensor and mortar or rocket aiming;
5. control effector package for the parafoil coupled with a control system to operate the control effectors under the direction of a remote operator;
6. an aileron package for the parafoil including aileron effectors to provide additional control authority under the control of the computerized control system;
7. a control inceptor package to allow a passenger in the mission module to manually operate the parafoil control effectors to manually pilot the mission module when the mission module is hanging from the parafoil canopy;
8. a control automation package including flight condition, navigation, mission and obstacle sensors to allow the control system to autonomously control the parafoil actuators, including to autonomously land the flight or mission module or the flight/mission module combination;
9. a propulsion package under the control of the control inceptors or the automated control system to provide forward thrust to either extend the glide of the parafoil or to allowed controlled flight of the mission module, flight module or flight/mission module combination when supported by the parafoil. The propulsion package may include a turbine engine and fuel supply. The propulsion package also may include thrust vectoring for additional control authority. Where the mission module includes a source of power, such as where the mission module is a ground vehicle, the propulsion package may utilize the motor of the ground vehicle or other power supply, to drive a propeller to push or pull the mission module. The propeller may be stored in a folded state and unfolded to propel the mission module when the mission module is suspended from the parafoil.

The modular self-rescue systems may share an attachment mechanism to the flight module and mission module, so that one system may be interchanged with another at a single location on the flight and mission module. The attachment mechanism may be any conventional mechanism known in the art to mechanically and releasably attach one structure to another, including a threaded attachment, a pinned attachment, a clamping attachment, a pneumatic attachment, a sliding attachment, a magnetic attachment, or an adhesive attachment.

Alternatively, sub-modules of the self-rescue system components may be independently attached and detached to and from the flight and mission modules; for example, a propulsion module may be selectably attached to the aft end of the mission module where the thrust of the propulsion module will act through the center of gravity of the mission module, while a parafoil and control system are attached to the top of the mission module and above the center of gravity.

Where the self-rescue system includes a parafoil installed on the flight module, the parafoil may be controllable through the flight control system of the flight module. The parafoil may include wing warping and CG effectors to achieve roll, yaw and pitch control. Alternatively, the parafoil may be equipped with ailerons or a combination of ailerons, wing warping and CG adjustment effectors. A parafoil attached to the mission module may be similarly configured and under the control of a mission module control system.

D. Self-Rescue May be Under the Control of the Flight Module Control System or of the Mission Module Control System The flight module control system constantly monitors the condition of the aircraft during flight, including the condition of the flight module and attached mission module. When the flight module control system detects a condition that exceeds predetermined limits, the flight module control system may select and implement a self-rescue strategy. A condition triggering self-rescue could, for example, be a missing rotor or stopped engine. In selecting the self-rescue strategy, the flight module control system may evaluate and utilize the remaining capabilities of the flight module. For example, if the ducted fans are at least partially functional, the flight module control system may elect to utilize the ducted fans to move the flight module or flight module/mission module combination when the flight module or flight module/mission module combination is suspended from a self-rescue parafoil.

The flight module control system will monitor its situation, for example, whether the flight module is located in hostile territory, whether the surrounding terrain renders a landing hazardous, whether a self-rescue option available to the control system will create a danger to other air traffic, and whether the flight or mission module presents a hazard to persons or to the mission. The flight module control system will use that situational awareness in making self-rescue determinations. In selecting the self-rescue strategy, the flight module control system may pick and choose which of the elements of the self-rescue system that it will implement and when it will implement those elements. For example, where self-rescue is necessary over hostile territory and the ducted fans are at least partially functional, the control system may elect not to detach the flight and mission modules and to instead launch only the flight module parafoil. The control system may then use the ducted fans to provide power to extend the glide of the flight module/mission module combination until the combination reaches a safer area. The control system may then jettison the mission module and pass control to a mission module self-rescue control system, which then will launch a parachute or parafoil for landing. As a second example, if the flight module control system determines that the flight module systems are degraded to the point that those systems offer no benefit to the survival of the mission module, then the control system will pass control to the mission module self-rescue control system and immediately jettison the mission module. The mission module self-rescue control system also has control over the disconnection system and may independently determine to disconnect from the flight module, as when the mission module self-rescue control system determines that the flight module control system is not functioning. Once disconnected, the mission module control system will launch a parachute or parafoil, as described above.

The mission module control system may allow passengers of the mission module to manually trigger disconnection between the mission and flight modules and to control the flight of the mission module through manipulation of control effectors. Alternatively, the mission module control system may have any level of automation. The mission module control system may be fully autonomous. The control system may determine a destination and may detect obstructions and identify suitable landing locations on its own and may autonomously land at a selected location. Alternatively, the control system may accept heading, waypoint and landing location commands from a passenger or remote operator and may implement those heading, waypoint and landing location commands. Where a single self-rescue system will protect both the mission and flight modules, the flight module control system will provide control having any level of autonomy, as described above.

E. Disconnection of the Flight and Mission Modules

The self-rescue system may include an apparatus to disconnect the flight module from the mission module during flight. The purpose of disconnecting the flight and mission modules is so that the mission module rescue system and the mission module itself are not required to support the weight of the flight module during self-rescue by the mission module and during a hard landing.

The flight module control system may disconnect the flight and mission modules by releasing the clamps of the docking system that attach the flight and mission modules; however, in the self-rescue situation time is of the essence and the docking system may be too slow in operation. The self-rescue system may include explosive charges to separate the flight and mission module. For example, explosive bolts may attach the docking system to the flight module or to the mission module. The control system of the flight module or mission module may detonate the explosive bolt to sever the bolts and immediately release the flight module and mission module. The use of the explosive charges may be available to the mission module self-rescue control system as a backup in the event the docking system or flight module control system is damaged, as by hostile action.

F. Separating the Flight and Mission Modules

Moving the flight and mission modules apart after disconnection is important to prevent fouling of the mission module parachute or parafoil by the disabled flight module. The task of separating the flight and mission modules may depend upon the remaining capabilities of the flight module, as detected by the flight module control system, and may be a part of the self-rescue strategy selected by the flight module control system. If both ducted fans are at least partially operational, the flight module control system may maneuver away from the falling mission module using the ducted fans. Even if only one ducted fan is in operating condition, the flight module control system may be able to move away from the mission module using the single ducted fan. If the condition of the ducted fans has degraded to the point that they are not able to move the flight module away from the mission module, the flight module control system may trigger supplemental rockets attached to the flight module or to the mission module to propel the flight and mission modules apart.

The flight module control system may be able to adopt other strategies for separating the flight module and mission module. For example, the self-rescue system of the mission module may include a first parachute attached to the underside of the mission module. In a self-rescue situation, the flight module control system may stop the rotation of the rotors and deploy the first parachute. Drag from the first parachute causes the flight and mission module combination to rotate to the inverted position so that the flight module is below the mission module. The control system commands release of the flight module from the mission module and the flight module falls away due to the force of gravity. The mission module may land in the inverted position, as where the mission module is unmanned. Alternatively, the control system for the mission module assumes control and disconnects the first parachute. The mission module control system deploys a second parachute or parafoil attached to the top of the mission module. When the second parachute or parafoil deploys, the mission module rotates to the upright position for landing.

As another alternative, the mission module self-rescue system may include a single parachute or parafoil attached to a movable trolley on a track that extends from the center of gravity on the top of the mission module to the side of the mission module. When the parachute or parafoil deploys, the trolley is located on the side of the mission module. The drag from the parachute or parafoil causes the flight/mission module combination to roll. The detached flight module then falls from the mission module due to the force of gravity. The trolley, with the parachute or parafoil attached, then moves along the track to the CG position on the top of the mission module, rolling the mission module to an upright position for landing.

As another example of the self-rescue options that the flight module control system may select to separate the mission and flight modules, where the flight module does not have enough authority to support the mission module in flight but has some residual authority, the flight module control system may command the aircraft to roll. Once the flight and mission module combination has rolled to the point that the flight module is no longer above the mission module, the control system releases the mission module and the ducted fans move the flight module away from the mission module. The mission module control system deploys a parachute or parafoil attached to the top of the mission module, which rolls the mission module to the upright position for landing.

E. Powered Flight During Self-Rescue and Center of Gravity Effectors

The self-rescue system may include a power source to keep the mission module airborne and controllable while hanging from the parafoil canopy. For example, where the mission module is a powered vehicle, the vehicle power supply may be attached to a propeller that is deployed when the parafoil is open. The vehicle power supply pulls or pushes the mission module through the air at a speed adequate to keep the parafoil inflated and to extend the range of the glide, or even to keep the mission module airborne. The mission module may include a dedicated engine, such as a turbine engine, to move the mission module through the air when the mission module is hanging from the parafoil.

Self-rescue may be necessary in situations where the ducted fans of the flight module are not capable of supported the mission module in flight, but do have some remaining authority. To provide the flight module more self-rescue options in this situation, a parafoil may have more than one point of attachment to the flight module. For example, the parafoil shrouds may be anchored substantially over the center of gravity of the flight module when the flight module is level. Secondary cables attach the parafoil shrouds to either the port or starboard end of one or both of the ducted fans. The secondary cables may be concealed inside the skin of the flight module and ducted fan. If the ducted fans are entirely disabled, as by rotor damage, the control system will launch the parafoil. The parafoil will then support the flight module above the flight module's center of gravity so that the flight module is generally level. A level orientation is useful for landing and if the parafoil is also supporting the connected mission module. The level orientation is not useful if only one of the ducted fans is operational, because the unbalanced thrust from the single ducted fan would cause the flight module to spin. To make thrust from the ducted fan useful, it must be near to a line running through the center of lift of the parafoil and the center of gravity of the flight module. In this circumstance, the flight module control system may release the anchor attaching the parafoil shroud over the level-flight center of gravity of the flight module so that the flight module hangs from the cables attached to the port or starboard end of the ducted fans. The center of thrust of the ducted fan therefore intersects the lift vector of the parafoil, allowing either or both ducted fans to apply thrust to the flight module and reducing the tendency of the flight module to spin.

The parafoil or parachute shrouds may be attached to a center of gravity effector, that will move the flight module or mission module with respect to the lift vector of the parafoil or parachute to adjust the orientation of the flight module or mission module, for example, to adjust the orientation of the flight module, mission module or the flight and mission module combination for landing. The center of gravity effector may be two or more cables attaching the parafoil or parachute shrouds to the flight module at different locations, with winches attached to each cable to adjust the center or gravity and orientation of the flight module with respect to the center of lift of the parafoil or parachute. The center of gravity effectors may be slides or trolleys that move with respect to the flight module or mission module.

F. Self-Rescue of the Flight Module Due to Damage to the Mission Module

Damage to the flight module is not the only circumstance in which the flight module, the mission module, or both may take self-rescue actions. For example, if the mission module is an unmanned weapons or cargo module and the flight module control system detects that a fire has broken out on the mission module and efforts to control the fire are unsuccessful, the flight module control system may jettison the mission module to protect the flight module. If the aircraft is in a location where jettisoning the mission module is not safe, the flight module control system may fly to a safer location to jettison the mission module. The flight module control system also may constantly monitor the condition of the mission module to determine whether the flight module should complete the mission; for example, if the flight module detects a malfunction of a weapons module, the flight module may cut short a mission and transport the weapons module to a maintenance facility.

IV. BRIEF DESCRIPTION OF THE DRAWINGS

FIGS. 6, 7 and 8 are perspective views of a high capability, medium capability and low capability self-rescue system, respectively, each configured to attach to the docking location on the mission module of FIG. 9.

FIG. 9 is a perspective view of a mission module having a docking location configured to attach to each of the self-rescue system of FIG. 6 through 8.

V. DESCRIPTION OF AN EMBODIMENT

Figure 1:
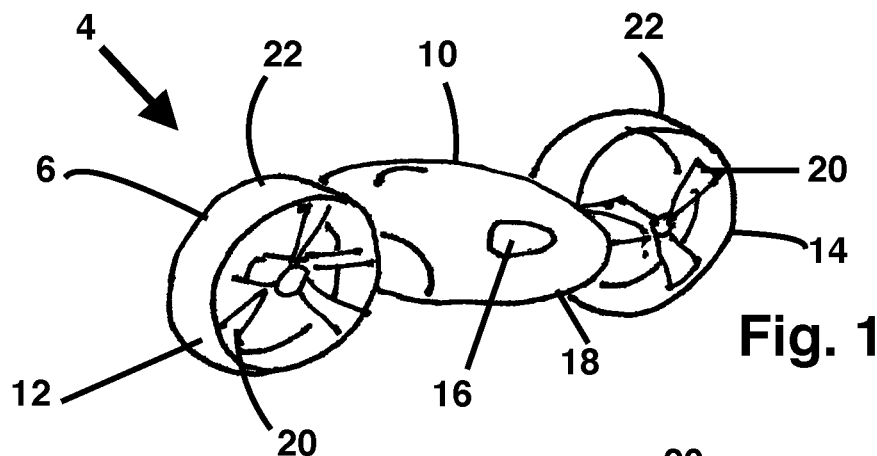
FIG. 1 is a perspective view of a flight module in the high-speed position.
Figure 2:
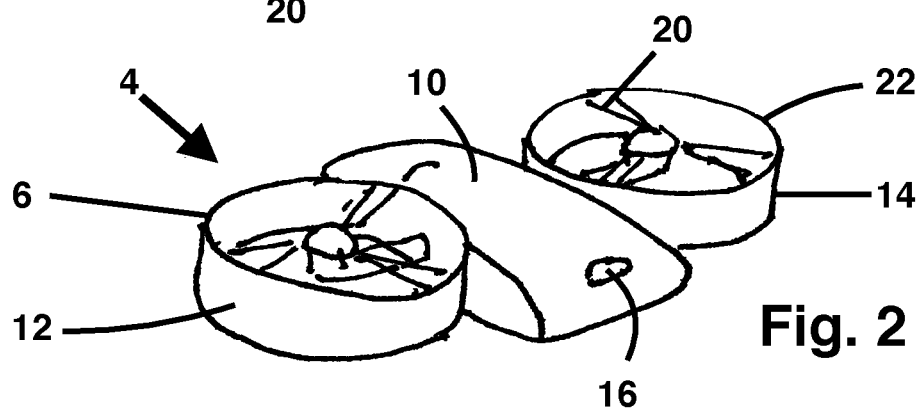
FIG. 2 is a perspective view of the flight module in the low-speed position.
Figure 3:
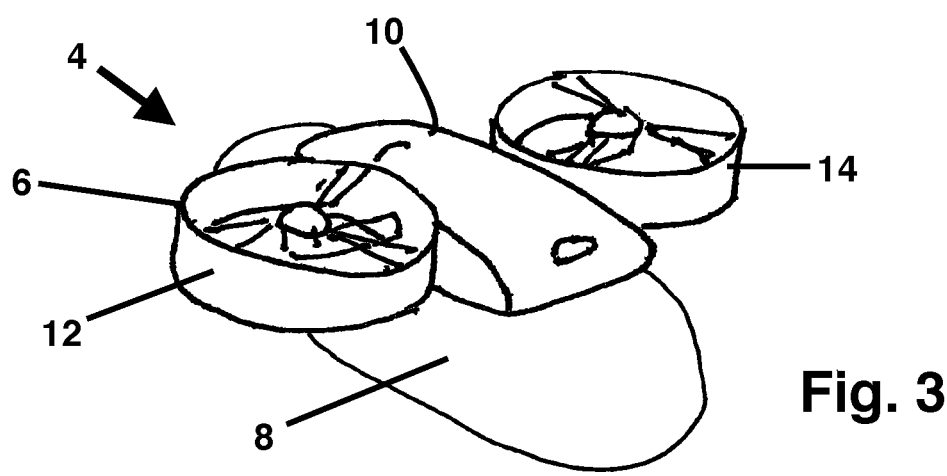
FIG. 3 is a perspective view of the flight module in the low-speed position with the mission module attached.

The Invention is a modular and interchangeable self-rescue system 2 for a modular and morphable air vehicle 4. The modular and morphable air vehicle 4 is unmanned and is illustrated by FIGS. 1-3. The air vehicle 4 includes a flight module 6 and may include a ground module 8. The flight module includes a central unit 10 and two ducted fans 12, 14. The central unit 10 includes one or more engines 16 and transmissions and the flight module control system 18. The ducted fans 12, 14 are powered by the engines 16 and are rotatable between a high-speed position, shown by FIG. 1, and a low-speed position shown by FIGS. 2 and 3. In the low-speed position, the spinning rotors 20 of the ducted fans 12, 14 provide lift to support the flight module 6. In the high-speed position, the ducted fans 12, 14 provide forward propulsion while lift is provided by the ducts 22 acting as circular wings. As shown by FIG. 3, the flight module 6 may support a mission module 8 in flight. The mission module 8 may be any of the mission modules 8 identified in the documents incorporated by reference and may be any other modular load. Among others, the mission module 8 may be a medical evacuation module, a passenger module, a weapons module or a cargo module.

Figure 4:
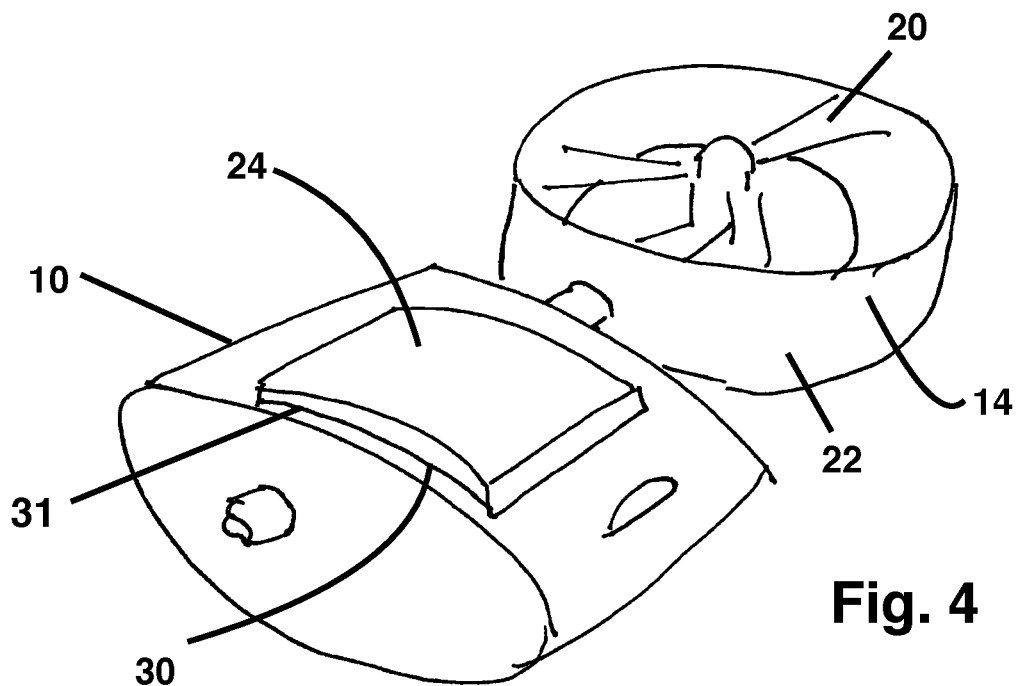
FIG. 4 is a perspective view of a flight module and self-rescue system with one ducted fan removed.
Figure 5:
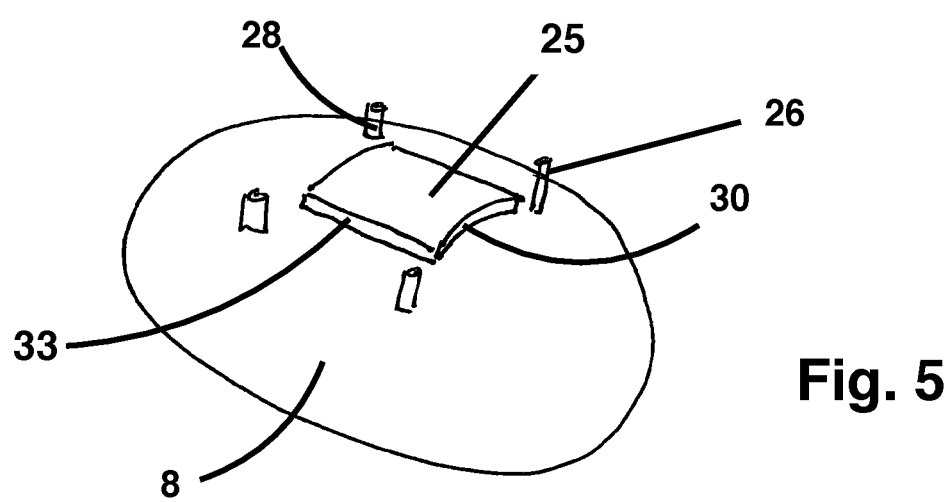
FIG. 5 is a perspective view of the mission module and self-rescue system.

FIG. 4 is a perspective view of a flight module 6 with the one of the ducted fans 12 removed and FIG. 5 is a perspective view of a mission module 8 that is detached from the flight module 6. As shown by FIGS. 4 and 5, an aircraft self-rescue apparatus 24 may be attached to the central unit 10. A mission module self-rescue apparatus 25 may be attached to the mission module 8. Each aircraft self-rescue apparatus 24 is interchangeable with other aircraft self-rescue apparatus 24, including aircraft self-rescue apparatus 24 of different capabilities, and is interchangeable with each mission module self-rescue apparatus 25.

The mission module 8 is releasably attached to the flight module 6 by a docking system 26 that may include releasable clamps. The docking system 26 may include explosive bolts 28 to allow quicker release of the mission module 8 from the flight module 6 than would be allowed by the releasable clamps. The rescue apparatus 24, 25 is releasably attached to the mission module 8 or the flight module 6 at an attachment location 30 by an aircraft attachment mechanism 31 or by a mission module attachment mechanism 33.

A single aircraft self-rescue apparatus 24 may be attached to the flight module 6 and may be configured to rescue the flight module 6 with the mission module 8 attached. As noted above, such an aircraft self-rescue apparatus 24 requires that the mission module 8 be capable of surviving a hard landing with the flight module 6 attached. To avoid damage to the mission module 8 or its passengers or cargo from such a landing, the mission module 8 would be robustly constructed. Robust construction carries with it a weight penalty that will reduce the range and performance of the flight module and mission module combination 6, 8. To avoid those range and performance penalties, the flight and mission modules 6, 8 may be separable in flight, as discussed below, and the flight 6 and mission 8 modules may be provided with independent self-rescue apparatus 24, 25 as illustrated by FIGS. 4 and 5.

FIGS. 6 through 9 show the interchangeable nature of the aircraft self-rescue apparatus 24 and the mission module self-rescue apparatus 25. FIGS. 6-8 illustrate three different self-rescue apparatus 24, 25, each having different capabilities. FIG. 6 shows a high capability self-rescue apparatus 32, FIG. 7 shows a medium capability self rescue apparatus 34 and FIG. 8 shows a low capability self rescue apparatus 36, all as described below. Each of the self-rescue apparatus 32, 34, 36 of FIGS. 6-8 is interchangeable one for another on the mission module 8, the flight module 6, or both the flight and mission modules 6, 8. Both the mission module 8 and the flight module 6 include an attachment location 30, so that aircraft and mission module self-rescue systems 24, 25 may be selected and interchangeably attached to the mission module 8 or the flight module 6. The greater the capability of the self-rescue apparatus 24, 25, the greater its weight and bulk and hence the greater the performance and range penalty to the aircraft. As described above, the mission planner or the owner of the flight module 6 and mission module 8 may select the self-rescue apparatus 24, 25 appropriate to the mission and to the value of the flight module 6, the mission module 8, or to the cargo or passengers of the mission module 8, consistent with the importance of performance and range to the mission objectives. In an appropriate circumstance, the mission planner or owner of the air vehicle may elect to entirely omit a self-rescue system 2 from the flight module 6 or the mission module 8 or both; for example, for the delivery of a crucial cargo at the range limits of the flight module 6 and mission module 8 combination.

From FIGS. 10 through 15, the self-rescue apparatus 24, 25 may itself be modular. The mission planner or the owner of the flight module 6 and mission module 8 combination may select which of the modular components to include in the self-rescue apparatus 24, 25 for any particular mission. As noted above, the self-rescue apparatus 24, 25 may include any or all of the following components: parachute with drogue parachute launch; parachute with mortar or rocket launch; a parafoil with mortar or rocket launch; a launch automation package with attitude or other sensors; a control effector package for controlling the parafoil; a transponder for situational awareness and operation of the control effectors by a remote pilot; an aileron package for the parafoil, a control inceptor package for passengers of the mission module; a flight control automation package to allow automated terrain and obstacle identification and automated landing; a sensor package that may include flight condition, navigation, mission and obstacle sensors for the flight control automation package; and a propulsion package to move the flight module 6 and mission module 8 combination through the air when suspended from the parafoil. The propulsion package may include a turbine engine and fuel supply and may include a propeller. The modular self-rescue apparatus 24, 25 may include any other modules that are useful to protection of the flight module 6, the mission module 8, or to the contents or passengers of the mission module 8.

Figure 10:
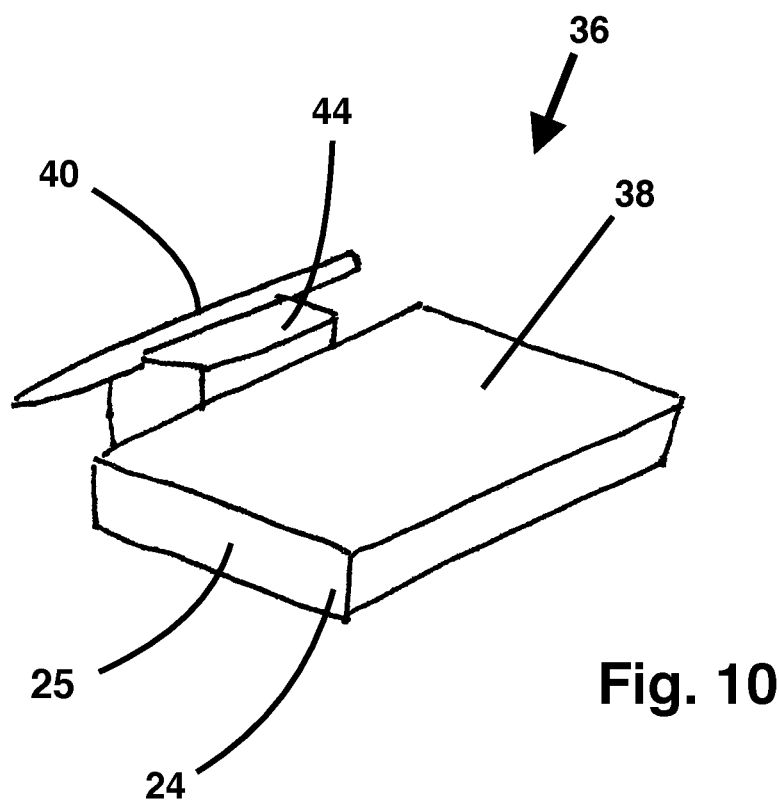
FIG. 10 is a perspective view of a low-capability self-rescue system.
Figure 11:
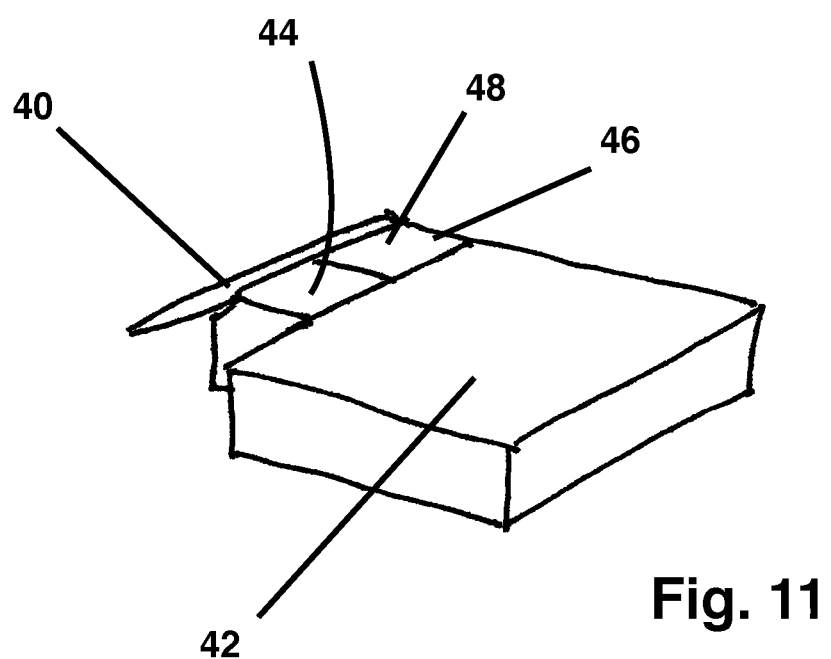
FIG. 11 is a perspective view of a medium capability self-rescue system.
Figure 12:
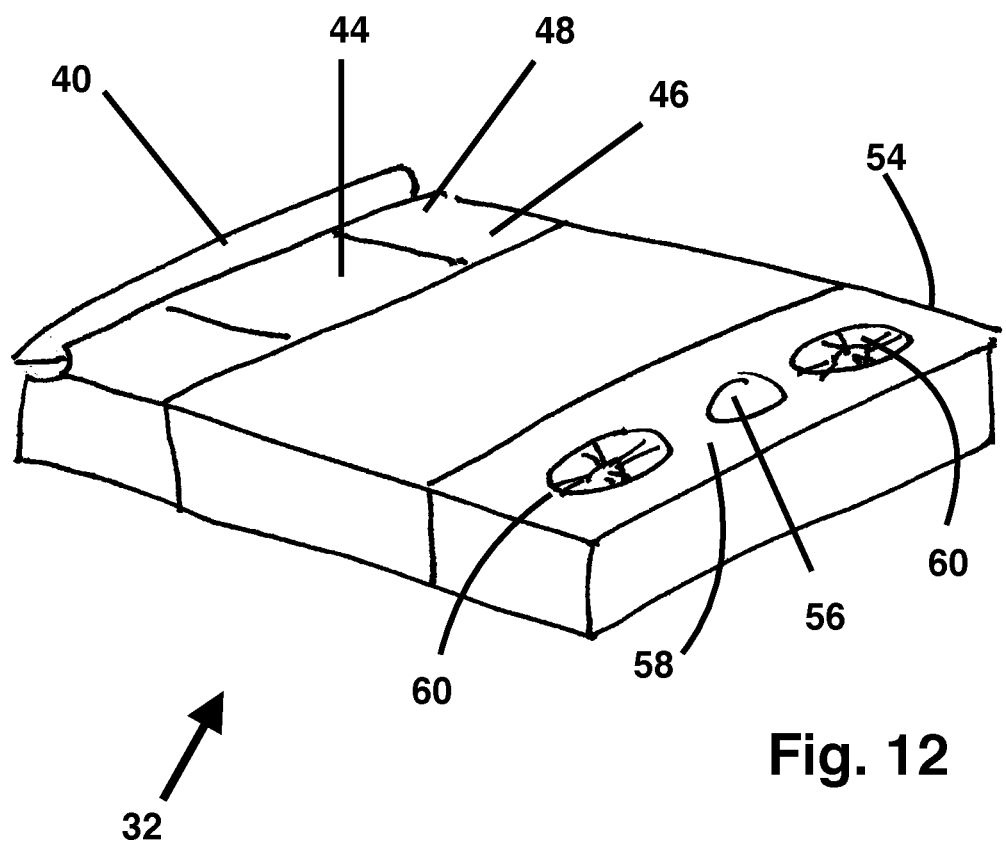
FIG. 12 is a perspective view of a high capability self-rescue system in the stowed position.

FIGS. 10, 11 and 12 illustrate three example combinations of modular components of the self-rescue apparatus 24, 25. FIG. 10 is a relatively low capability self rescue apparatus 36, also as shown by FIG. 8, ready to be attached to the flight module 6 or mission module 8. The self-rescue system 36 of FIG. 10 includes a parachute 38 with launch by a rocket 40 and a launch automation package 44. The launch automation package 44 may include attitude, speed or other sensors to determine the optimal direction to steer the rocket 40. The launch automation package 44 also may detect conditions warranting self-rescue, such as an instruction to that effect from the flight module control system 18 or changes in acceleration velocity or attitude indicating that the flight module 6 is no longer supporting the mission module 8 in flight, an instruction from a passenger of the mission module to initiate self-rescue, or an instruction from a remote pilot to initiate self-rescue. Upon initiating self-rescue, the launch automation package 44 may detonate the explosive bolts 28 joining the flight 6 and mission modules 8, select a direction to steer the rocket 40 and ignite the rocket 40 towing the parachute 38. The low-capability system 36 of FIG. 10 alternatively may include a drogue-launched parachute 38. For any of the combinations, mortar launch may be substituted for launch by a rocket 40.

FIG. 11 includes an example medium capability self-rescue system 34, also shown by FIG. 7. The medium-capability self-rescue system 34 includes a parafoil 42 along with the launch automation package 44 and rocket 40. The medium capability system 34 also includes a control effector package 46 and transponder 48 to allow a remote pilot, either human or automated, to operate the control effector package 46 to control the glide of the parafoil 42. The control effector package 46 may include winches to adjust the position of the parafoil shrouds to thereby change the shape of the parafoil canopy to steer the parafoil 42 through wing-warping. The control effector package 46 also may include center of gravity effectors to move the center of gravity of the flight module 6 or mission module 8 with respect the center of lift of the parafoil 42, as by shortening or lengthening the shrouds on one side of the parafoil 42 compared to the other side of the parafoil 42.

Figure 13:
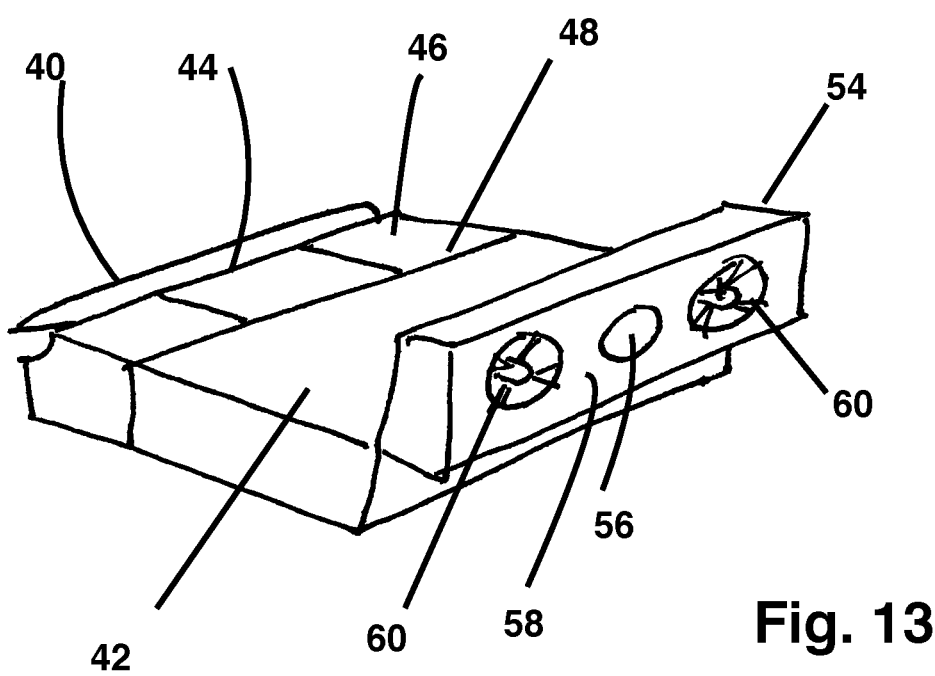
FIG. 13 is a perspective view of a high capability self-rescue system in the deployed position.
Figure 14:
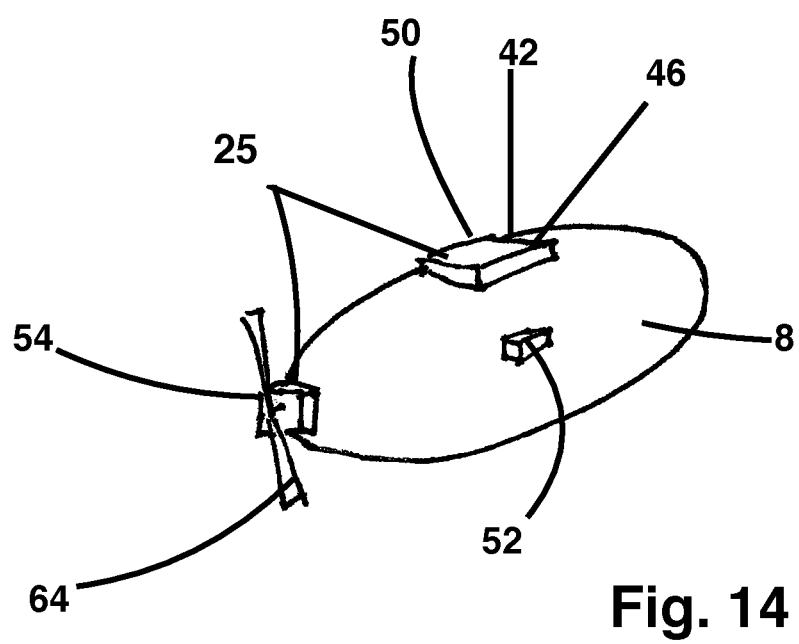
FIG. 14 is a perspective view of a mission module with the modular self-rescue system mounted to different locations on the mission module.

FIGS. 13 and 14 show a high-capability self-rescue system 32, also as shown by FIG. 6. The high-capability system 32 includes a parafoil 42 with steerable rocket 40 launch, a control effector package 46 and transponder 48. The high-capability system 32 also includes a flight control automation package 50 coupled with a propulsion package 54 and automation sensors 52 for flight condition, navigation, terrain and obstacles. The flight condition sensors may include altitude, attitude, airspeed, air temperature and all other sensors needed to provide the automated flight control package with enough information to control the flight of the flight module 6 or mission module 8 when suspended from the parafoil 42. The navigation sensors may include a GPS receiver to determine geographic position. The radio transponder 48 may complement the GPS receiver by receiving information on the situation of the flight or mission module 6, 8, such as the location of terrain or anthropogenic features or the presence of hostile forces. The terrain and obstacle sensors may include lidar, radar or optical sensors to detect terrain, trees, poles, wires or other objects that may interfere with the flight or landing of the flight or mission module 6, 8 when suspended from the parafoil 42.

FIG. 12 also shows that the self-rescue apparatus 24, 25 may itself be modular and may be assembled by an operator from sub-modules, such as a parafoil 42 sub-module, a steerable rocket 40 sub-module, and a flight control automation 50 sub-module. The self-rescue apparatus 24, 25 may be assembled by the operator from sub-modules having any of the self-rescue features described in this document.

The propulsion package 54 illustrated by FIGS. 12 and 13 includes a turbine engine 56 and a fuel supply 58 for the turbine engine 56. FIG. 12 shows the propulsion package 54 in a stowed position and FIG. 13 shows the propulsion package 54 in a deployed position, ready to provide thrust to the flight module 6 or to the mission module 8 when suspended from the parafoil 42. In the example of FIGS. 12 and 13, the turbine engine 54 drives a pair of ducted propulsion fans 60. Alternatively, the propulsion package 54 may rely on reaction thrust of the turbine engine 56, or the turbine engine 54 may drive a propeller. The exhaust of the turbine engine 56 may be vectored for additional directional control authority.

The three example self-rescue systems 32, 34, 36 described above are only examples and the owner or operator of the flight module 6, the mission module 8, or the combination of the flight and mission modules 6, 8 may select any combination of modular sub-systems for use on the flight module 6, mission module 8, or the combination of the flight and mission modules 6, 8. For example, owner or operator may select that the parachute 38 or parafoil 42 may be attached to an aimable mortar for launch rather than a rocket 40. The owner or operator may select that a control inceptor package 62 be installed inside the mission module 8 and accessible to a passenger of the mission module 8. The control inceptor package 62 may allow the passenger to manually trigger self-rescue, as by disconnecting the flight and mission modules 6, 8 and activating the mission module 8 self-rescue apparatus 24. The control inceptor package 62 may allow the passenger to select a destination and waypoints or a heading or to select a landing location. The control inceptor package may allow the passenger to assume manual control of the control effectors of the control effector package 46 or of the propulsion package 54. The owner or operator may select to add a modular aileron package 65 to the parafoil 42 to provide additional control authority to the parafoil 42. The owner or operator may select that any of the other systems or subsystems described in this document be selectably included or excluded from the self-rescue apparatus 24.

FIG. 14 illustrates that while a self-rescue apparatus 24 may be installed at a single attachment location 30 as described above for FIGS. 4-9, the modular sub-systems of the self-rescue apparatus 24 may be installed at different locations on the flight module 6, the mission module 8 or the combination of the flight and mission module 6, 8. FIG. 14 shows a mission module 8 in which the self-rescue apparatus 24 includes a propulsion package 54. The propulsion package is attached to one end of the mission module 8 and includes a propeller 64. The automation sensors 52 are located on another location on the mission module 8 that is better for operation of the sensors 52, and may be distributed about the mission module 8. The parafoil 46 is anchored near the center of gravity of the mission module 8 so that the mission module 8 will be oriented properly for landing. The parafoil 42 is under the control of the control effector package 46 and all subsystems are under the control of the flight control automation package 50.

Figure 15:
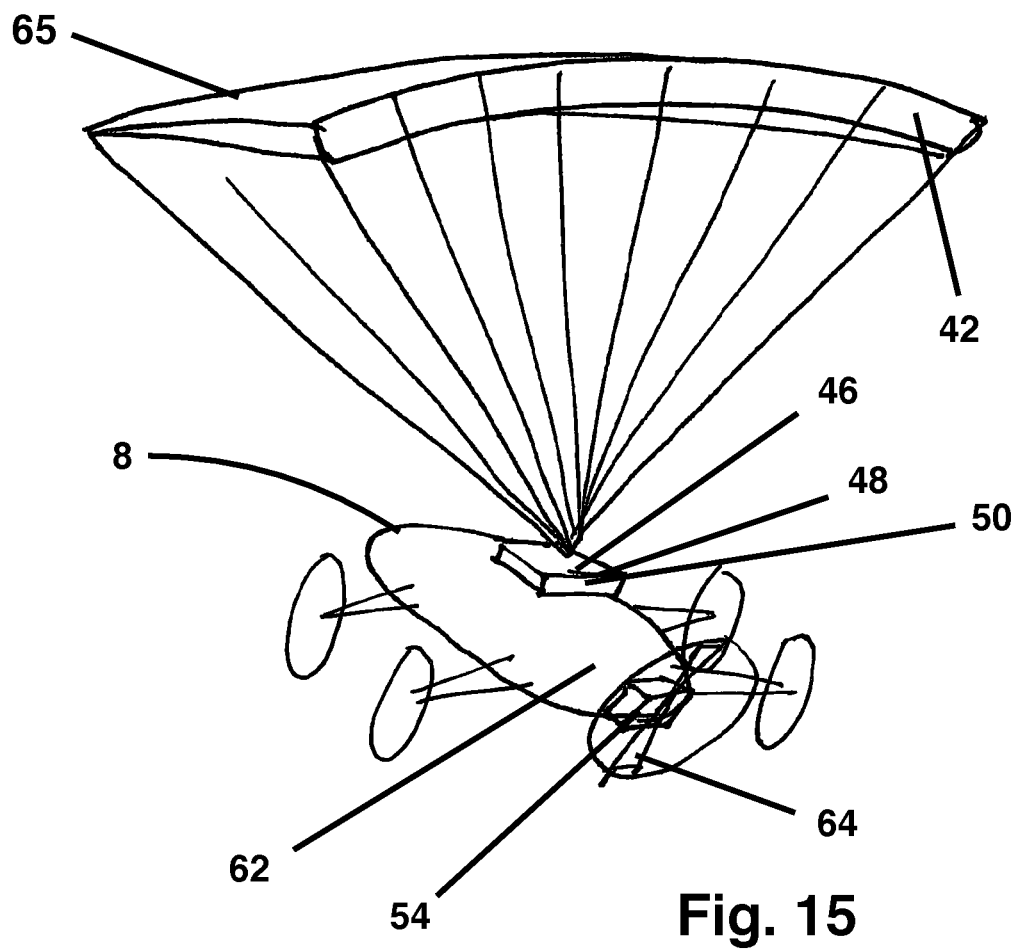
FIG. 15 is a perspective view of the mission module suspended from a parafoil where the mission module is a ground vehicle with an engine.

FIG. 15 illustrates that the self-rescue apparatus 24 may re-purpose resources on board the mission module 8, the flight module 6 or both the combination of the flight and mission modules 6, 8. In the example of FIG. 15, the mission module 8 is a ground vehicle with an engine used to power the ground vehicle on the ground. In the self-rescue situation, the ground vehicle engine becomes the propulsion package 54 and drives a propeller 64 to pull the mission module 8 through the air when the mission module 8 is suspended from the parafoil 42. The propeller 64 may be folded or retracted or both when not in use. A power takeoff from the ground vehicle engine selectably powers the propeller through an electric clutch, all under the control of the flight control automation package 50, under the control of a passenger of the mission module 8 through the control inceptor package 62, or under the control of a remote operator through the radio transponder 48. As a second example of utilizing resources of the flight module 6, the flight module control system 18 may serve as the launch automation 44 controller and as part of the flight control automation package 50.

Figure 16:
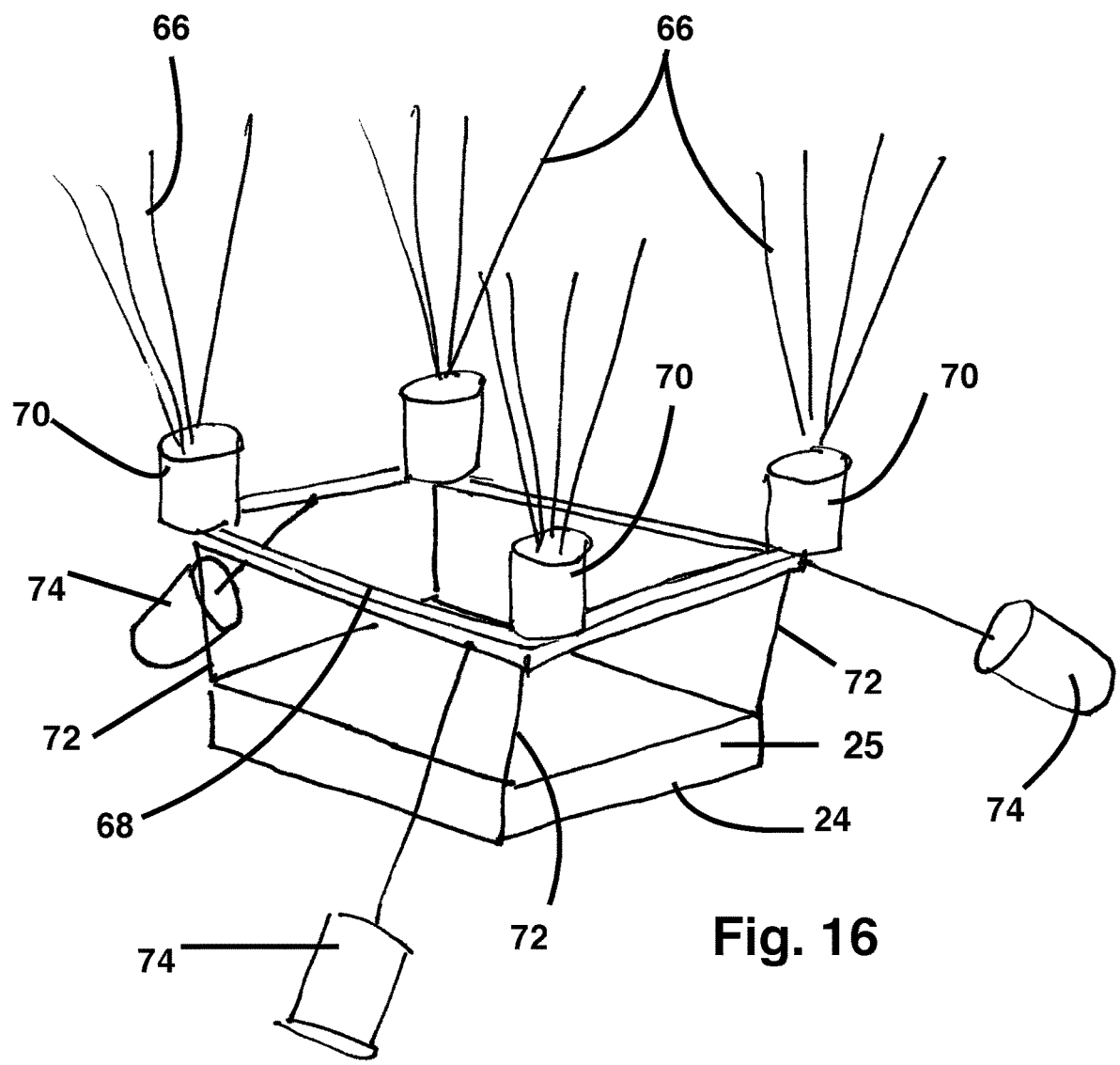
FIG. 16 is a perspective view of center of gravity control and steering control effectors for a parafoil.

FIG. 16 shows a center of gravity adjustment mechanism and steering mechanism for the mission module 8, the flight module 6 or the combination of the mission and flight modules 8,6 when suspended from the parafoil 42. The shrouds 66 of the parafoil 42 are attached to a frame 68 through winches 70. The winches are part of the control effector package 46 and allow the relative length of the shrouds 66 to be adjusted by the flight control automation package 50 to steer the parafoil 42. The frame 68 is attached to the self-rescue apparatus 24 by cables 72. Center of gravity actuators 74 are part of the control effector package 46 and are configured to move the frame 68 with respect to the self-rescue apparatus 24, and hence to move the center of gravity of the flight module 6, mission module 8, or combination of the flight and mission modules 6, 8 with respect to the inflated parafoil 42, all under the control of the flight control automation package 50.

Figure 17:
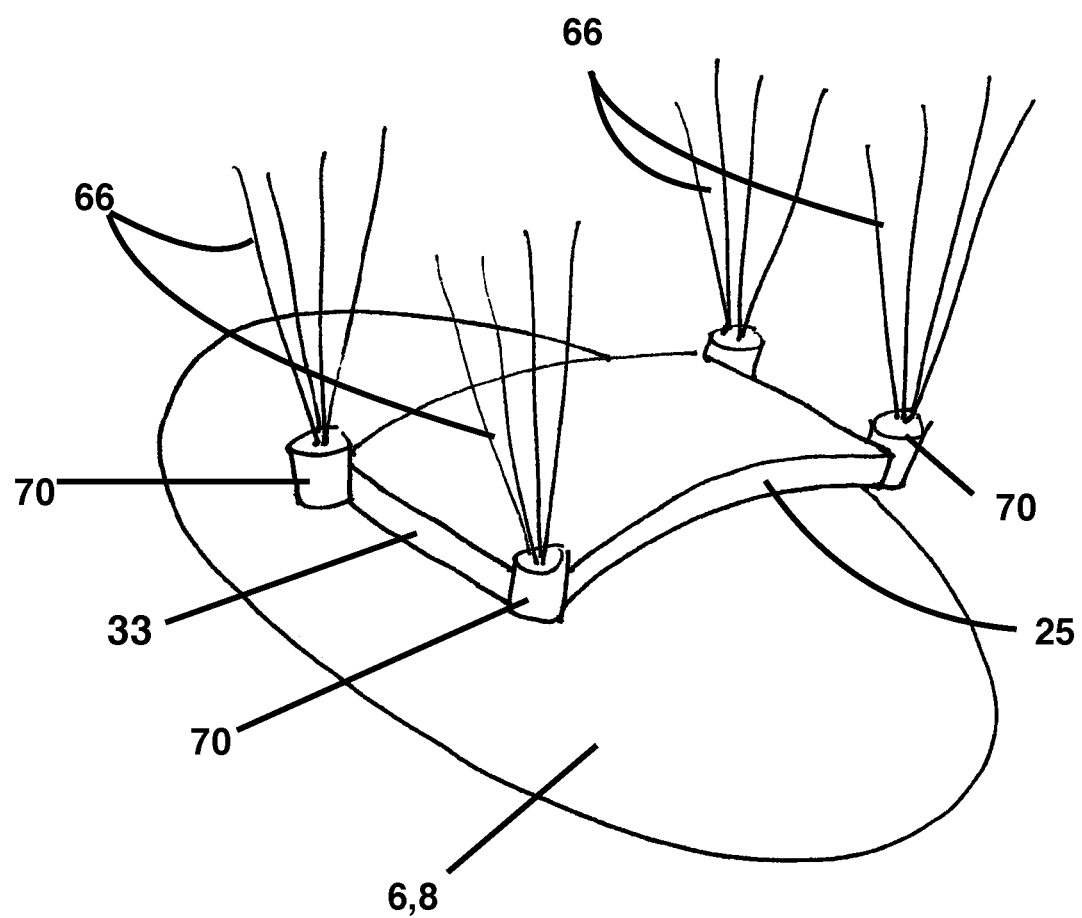
FIG. 17 is a perspective view of integrated center of gravity and steering control effectors for a parafoil.

FIG. 17 shows a combination center of gravity adjustment mechanism and steering mechanism. The shrouds 66 of the inflated parafoil 42 are attached to the flight module 6, mission module 8 or combination of flight and mission modules 6, 8 by winches 70. Winches 70 are spaced apart by an adequate distance to allow the flight control automation package 50 to adjust both the center of gravity and to steer the parafoil 42 by adjusting the relative length of the shrouds 66. The system of FIG. 17 dispenses with the frame 68 and center of gravity actuators 74 of FIG. 16.

Figure 18:
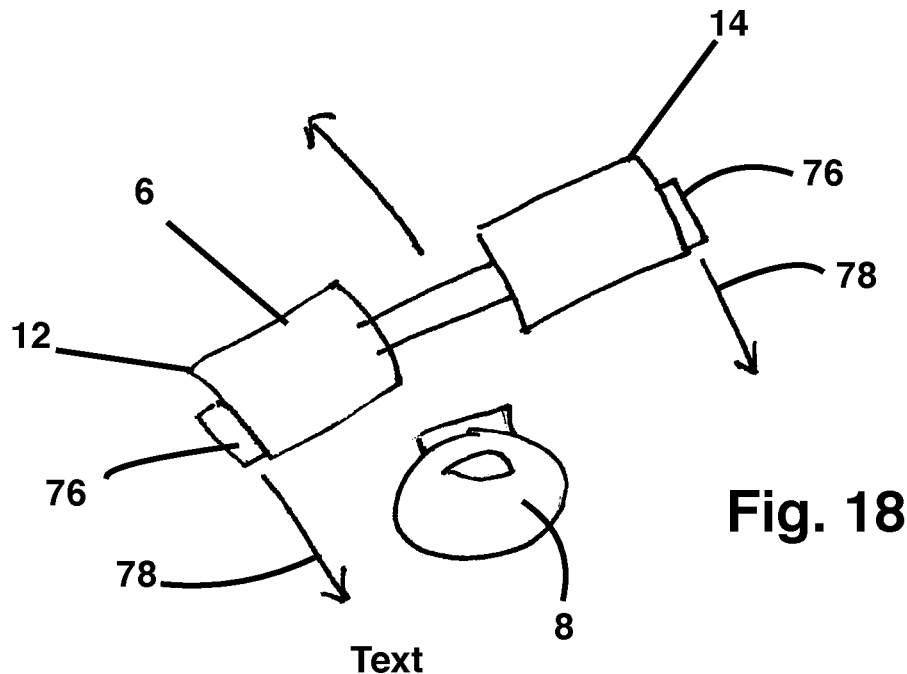
FIGS. 18 and 19 illustrate a separation between the flight and mission module using lift from the ducted fans or thrust from auxiliary rockets.
Figure 19:
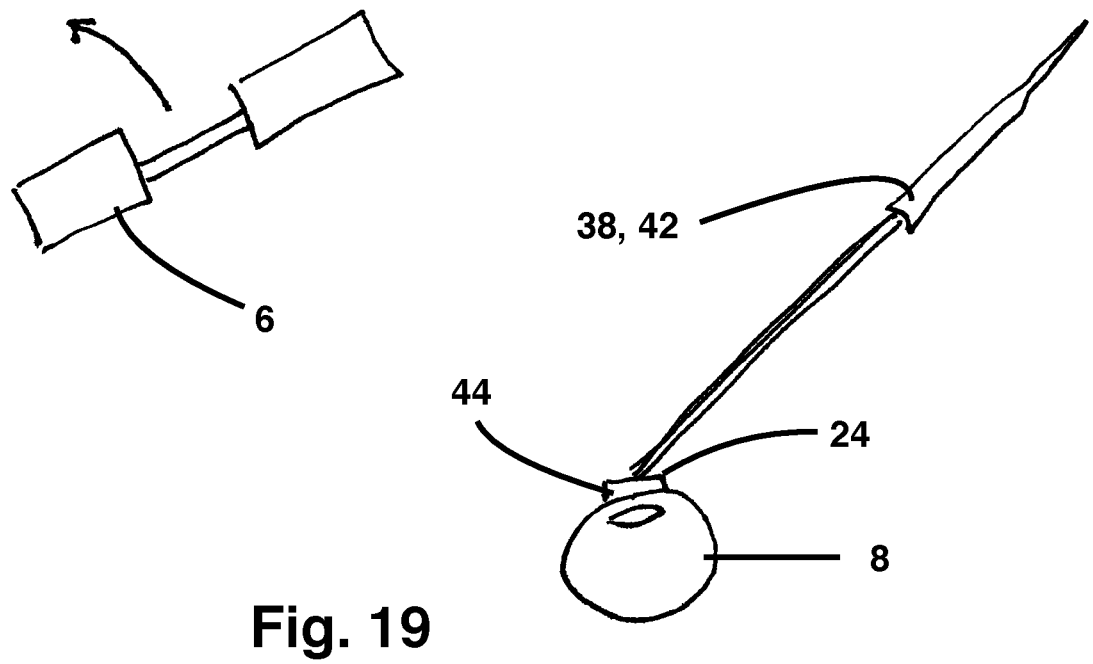
Figure 20:
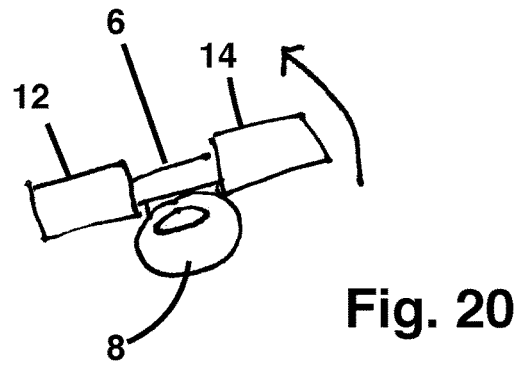
FIGS. 20, 21, 22, 23 and 24 illustrate separation between the flight and mission modules by rolling the aircraft.
Figure 21:
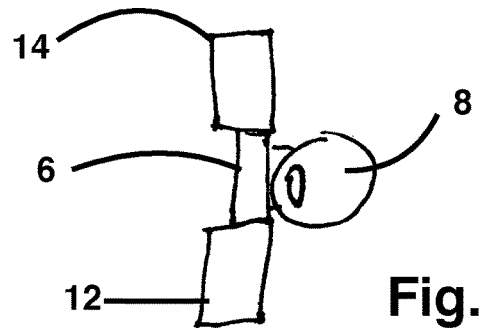
Figure 22:
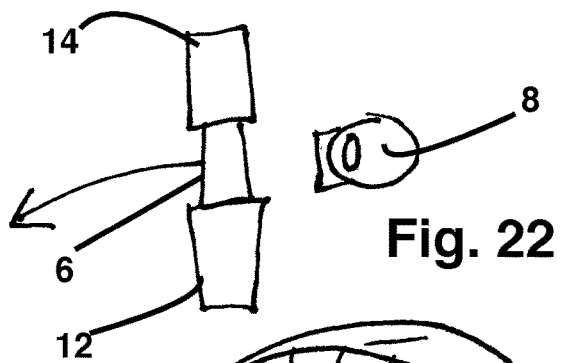
Figure 23:
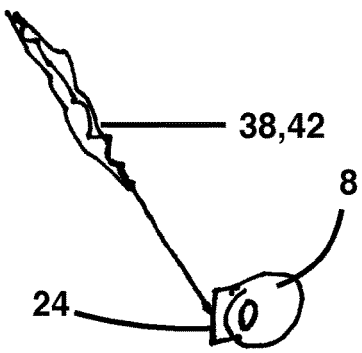
Figure 24:
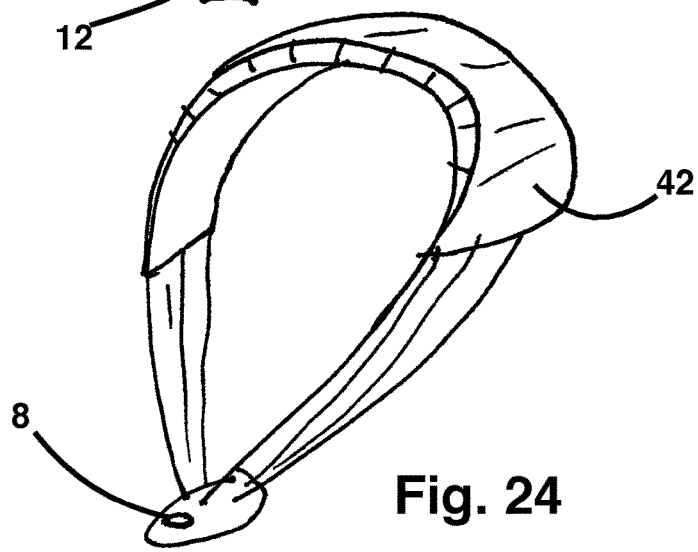
Figure 25:
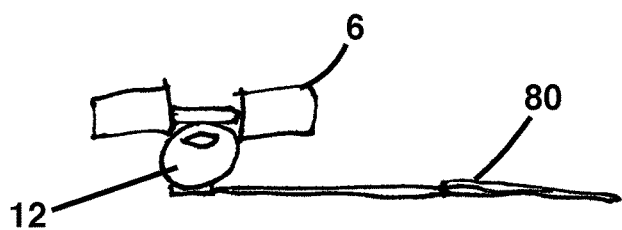
FIGS. 25, 26, 27, 28 and 29 illustrate separation between the flight and mission modules using a secondary parachute.
Figure 26:
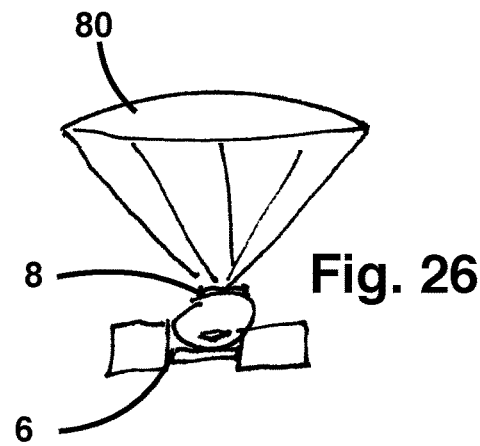
Figure 27:
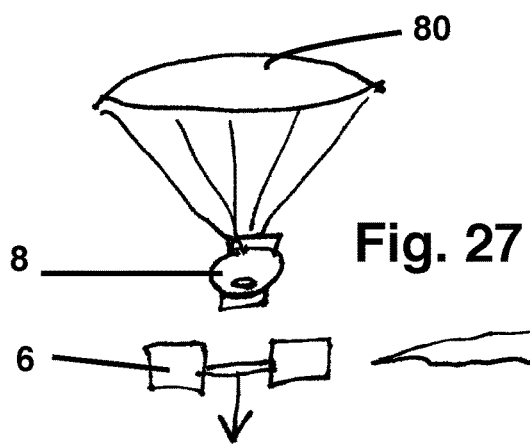
Figure 28:
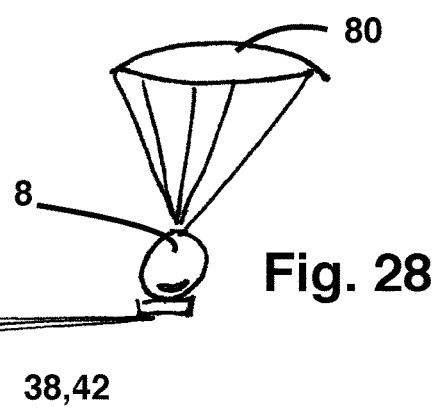
Figure 29:
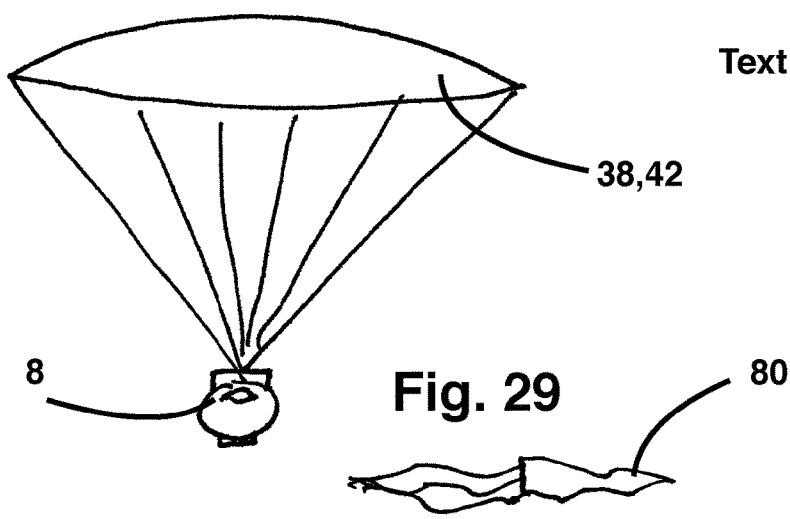

FIGS. 18 and 19 illustrate a first mechanism for separating the flight and mission modules 6, 8 upon release of the mission module 8. If the flight module control system 18 determines that the flight module 6 has adequate authority using the ducted fans 12, 14 to fly away from the mission module 8, the flight module control system 18 will elect to do so and will use the ducted fans 12, 14 to move the flight module 6 away from the mission module 8. If the control system 18 determines that the ducted fans 12, 14 do not have adequate authority, the control system 18 may call upon the thrust 78 provided by supplemental rockets 76 to move the flight module 6.

FIG. 19 illustrates the flight module 6 and mission module 8 as the flight module 6 moves away from the mission module 8. The launch automation system 44 launches the parachute 38 or parafoil 42 away from the flight module 6 and in a direction that will assist in opening of the parachute 38 or parafoil 42.

FIGS. 20 through 23 show a another avenue that may be selected by the flight module control system 18 to separate the flight 6 and mission 8 modules. If the control system 18 determines that the ducted fans 12, 14 has some authority but not enough to fly away from the mission module 8, the control system 18 may cause the flight module and ground module combination 6, 8 to roll so that the flight module 6 is no longer above the mission module 8, shown by FIGS. 20 and 21. From FIG. 22, the control system 18 then will disconnect the flight and mission modules 6, 8 and use the remaining authority of the ducted fans 12, 14 to move the flight module 6 away from the mission module 8. From FIG. 23, the flight module control system 18 passes control to the mission module 6 launch automation package 44 or flight control automation package 50, which launches the parachute 38 or parafoil 42. The drag of the parachute or parafoil 42 rights the mission module 8 for landing, shown by FIG. 23.

FIGS. 25 through 29 show another mechanism for separating the flight 6 and mission modules 8 that may be selected by the control system 18, particularly where the ducted fans 12, 14 do not have adequate authority to assist in that separation. In the self-rescue situation, the control system 18 causes a secondary parachute 80 anchored to the bottom side of the mission module 8 to deploy. The drag from the secondary parachute 80 causes the flight module 6 and mission module 8 combination to roll so that they are in an inverted position, with the mission module 8 above the flight module 6. The control system 18 then passes control to the launch automation system 44 of the mission module 8 and disconnects the air module 6. The flight module 6 falls away due to the force of gravity. The mission module 8 launch automation package 44 launches the primary parachute 38 or parafoil 42, which is anchored to the top side of the mission module 8. The launch automation package releases the secondary parachute 80. The drag from the primary parachute 38 or parafoil 42 rolls the mission module to the upright position for landing. As noted above, landing in the inverted position may be appropriate for some mission modules 8, such as unmanned cargo or weapons modules 8, in which event the primary parachute 38 or parafoil 42 may be mounted to the bottom side of the mission module 8 and the secondary parachute 80 may be eliminated.

Figure 30:
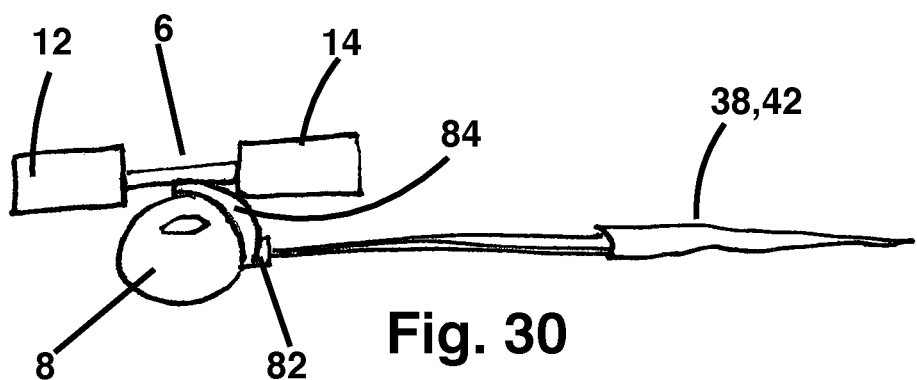
FIGS. 30, 31 and 32 illustrate separation between the flight and mission modules using a trolley that travels on a track.
Figure 31:
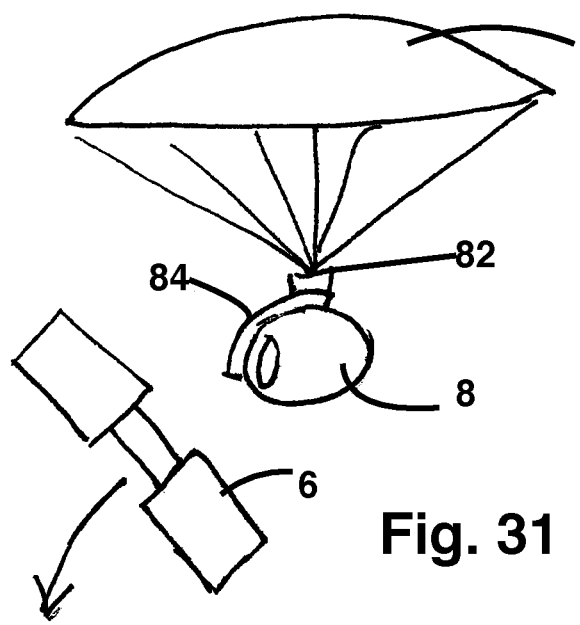
Figure 32:
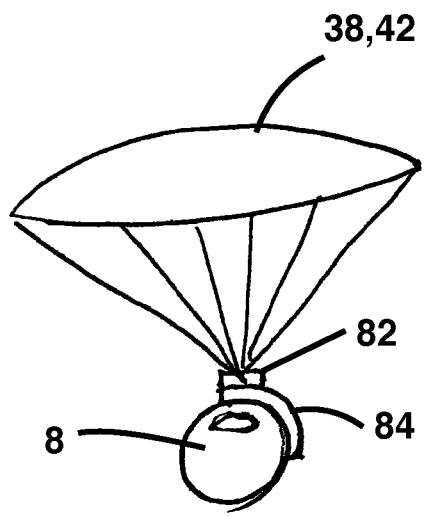

FIGS. 30 through 32 provide another mechanism to separate the flight and mission modules 6, 8, particularly where the ducted fans 12, 14 of the flight module 6 are not able to assist. As shown by FIG. 30, the shrouds 66 of the parachute or parafoil 38, 42 are attached to a trolley 82 that is configured to move on a track 84. The track 84 runs from the side of the mission module 8 to a location substantially above the center of gravity of the mission module 8 when the mission module 8 is in an orientation for landing. In the self-rescue situation, the rocket 40 or mortar launches the parachute 38 or parafoil 42. From FIG. 31, the drag of the parachute 38 or parafoil 42 causes the mission module 8 and flight module 6 combination to roll so that the flight module 6 is no longer over the mission module 8. The flight module 6 is released from the mission module 8 and the flight module falls away due to the force of gravity. The trolley 82 moves on the track so that the mission module revolves under the shrouds 66 of the parachute 38 or parafoil 42 until the mission module 8 is oriented for landing.

Figures 33, 34, 35:
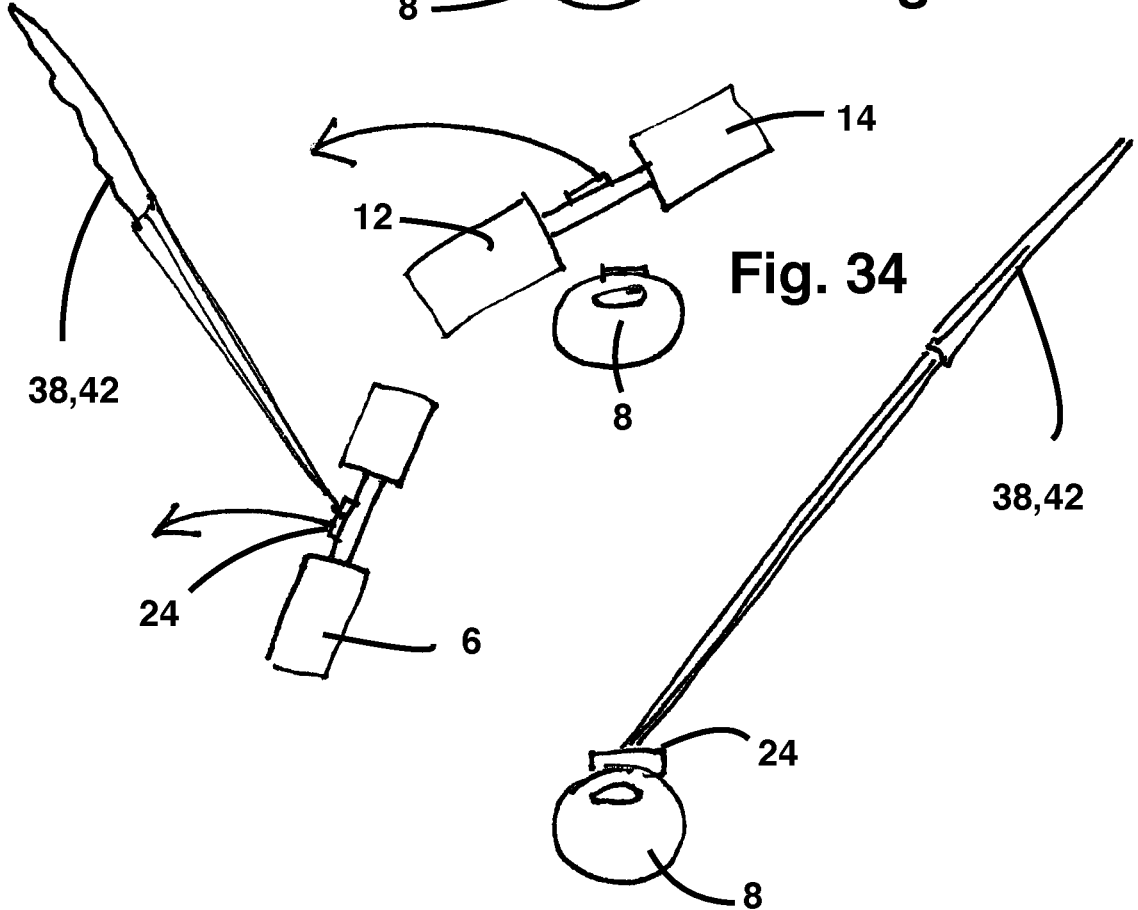
FIGS. 33, 34 and 35 illustrate separation between the flight and mission modules using lift from the flight module and separate rescue apparatus for the flight and mission modules.

FIGS. 32 through 34 illustrate that a single functional ducted fan 12, 14 may be enough to separate the flight module 6 and mission module 8 and that the flight and mission modules 8 may each have a self-rescue apparatus 24. From FIGS. 32 and 33, if a self-rescue situation occurs, such as a stopped engine or failed rotor of the flight module 6, the flight module control system 18 may determine that the other ducted fan (ducted fan 14 in this instance) is still operational. The flight module control system 18 may elect to detach the flight module 6 and mission module 8 and to utilize the working ducted fan 14 to move the flight module 6 away from the mission module 6. In FIG. 34, the flight module control system 18 has passed control of the mission module self-rescue apparatus 24 to the launch automation package 44 of the mission module 8, which launches the parachute 38 or parafoil 42 away from the flight module 6. The flight module control system 18 launches the parachute 38 or parafoil 42 of the flight module 6 away from the mission module 8, so that both modules 6, 8 may separately land safely.

Figure 36:
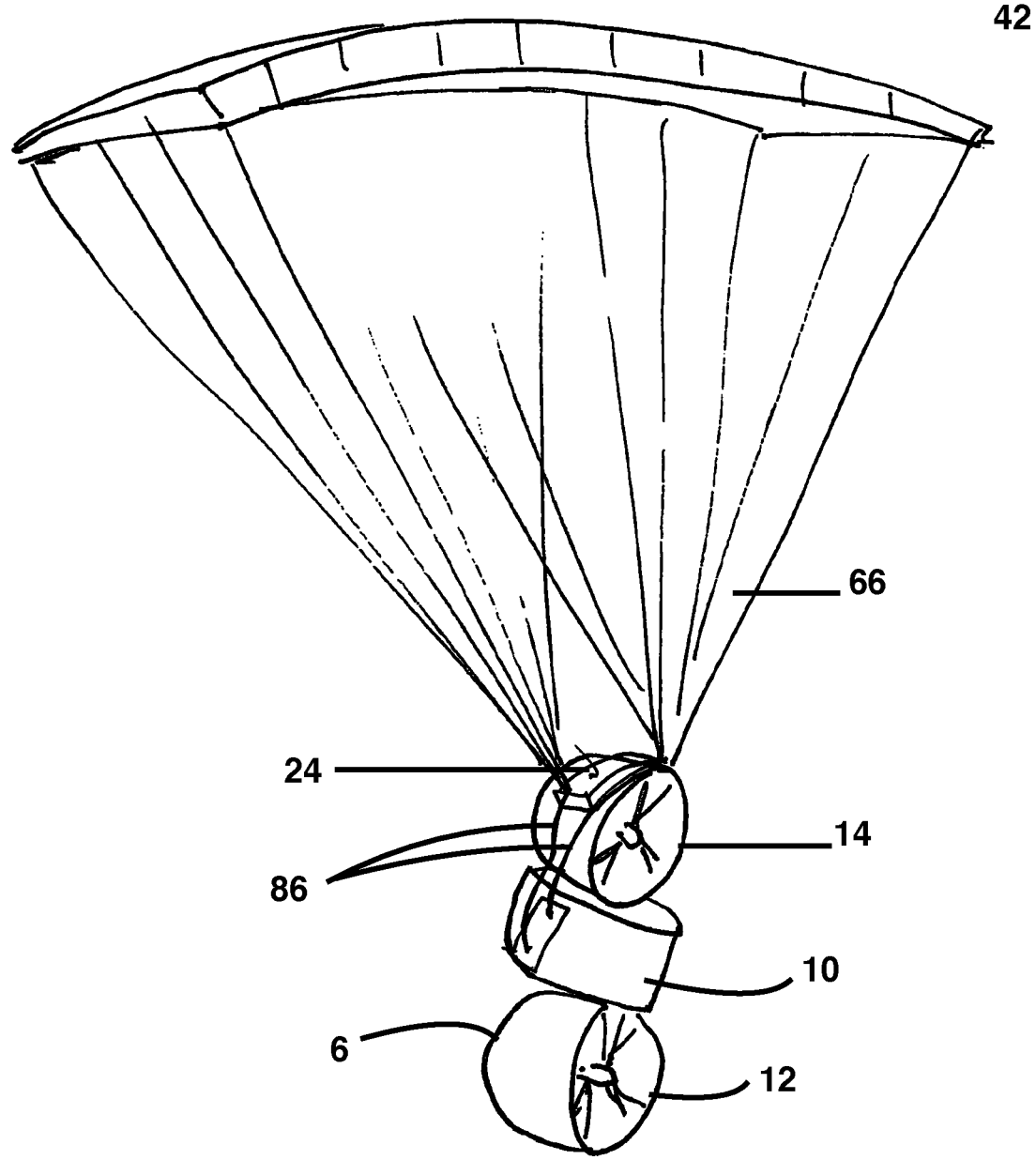
FIG. 36 illustrates suspending the flight module by a duct.

FIG. 36 illustrates that one of the ducted fans 12, 14 of a flight module 6 may be operational when the flight module 6 is suspended from the parafoil 42 and that the ducted fan(s) 12, 14 may provide thrust to extend the glide of the parafoil 42 or to keep the flight module 6 airborne. The net thrust vector of the ducted fans must pass through the net lift vector of the parafoil 42; otherwise, the flight module 6 will spin uncontrollably. One way to provide that the net lift vector and net thrust vectors coincide is to support the flight module on its end from one of the ducted fans 12, 14. The parafoil 42 may be located at the end of the ducted fan 12, 14 prior to launch. Upon launch, the parafoil 42 supports the flight module 6 from the end of the ducted fan 12, 14. Auxiliary cables 86 may link the shrouds 66 with the center of gravity of the flight module 6 when the flight module 6 is oriented for landing. When the flight module 6 is ready to land, the control system 18 releases the shrouds 66 from the end of the ducted fan 12, 14 and the auxiliary cables suspend the flight module from the center of gravity for landing, which re-orients the air module 6 to the landing position. The auxiliary cables 86 may be hidden within the skin of the ducted fan 12, 14 and the central unit 10 and may penetrate the skin when the shrouds are released from the end of the duct 12, 14.

Figure 37:
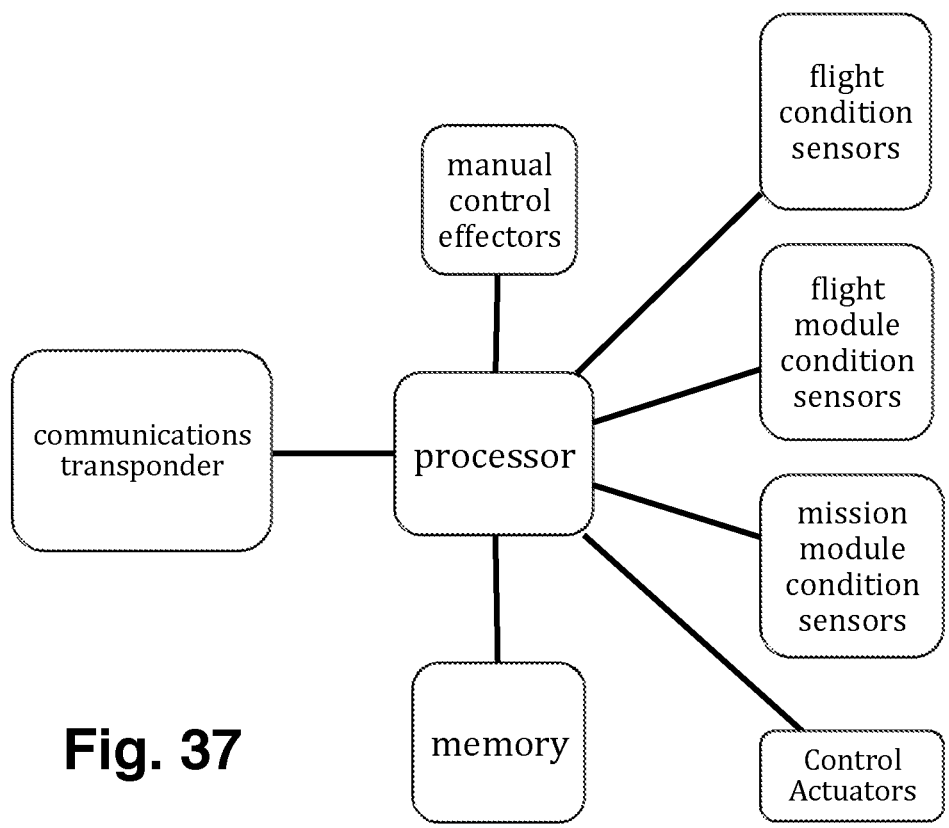
FIG. 37 is a schematic diagram of the flight module control system components that operate the self-rescue system.

FIG. 37 is a schematic diagram of the portions of the flight module control system 18 that select the self-rescue strategy and that also provide launch automation and flight control automation for an aircraft self rescue apparatus 24 protecting the flight module 6 or the combination of the flight and mission modules 6, 8. The communications transponder informs a remote operator of the condition of the flight and ground modules 6, 8 and relays situational information (such as terrain, hostile action, and other air traffic information) and instructions to the processor from the remote operator. The manual control inceptors provide instructions to the processor from a passenger of the mission module. The flight condition sensors detect the aircraft attitude, altitude, airspeed, temperature, accelerations and all other information to inform the control system 18 of the flight of the air module 6, including when the air module 6 is suspended from the parafoil 42. The flight module 6 condition sensors monitor the physical state of the flight module 6, such as the condition of the engine, rotors, fuel supply, electrical and hydraulic supply, vibration, bearing temperatures, and all other information needed to inform the control system 18 as to the ability of the flight module 6 to complete its missions. The mission module 8 condition sensors detect, for example, whether a weapons module is functional or whether a cargo module is burning. If a condition exists on a mission module 8 that may prevent the flight module 6 from completing its missions or that may present a hazard to others, the flight module control system 18 may take appropriate action, such as jettisoning a mission module 8 or delivering the mission module 8 to a remote location. The control actuators operate the controls of the flight module 6, such as opening docking system 26 clamps holding the mission module 8, detonating explosive bolts 28 attaching the mission module 8 to the flight module 6, launching a steerable rocket 40 and steering the rocket 40 to launch a parachute 38 or parafoil 42, aiming a mortar and firing the mortar to launch the parachute 38 or parafoil 42, operating center of gravity actuators 74 to adjust the center of gravity of the air module 6 or air module 6 and ground module 8 combination with respect to the mission module 8, operating steering winches 70 to lengthen or shorten parafoil shrouds 66 to steer the parafoil 42, operating a propulsion package 54 to provide forward thrust to the parafoil 42, operating the ducted fans 12, 14 to provide forward thrust to a parafoil 42, operating an engine on board the mission module 8 to provide forward thrust to the parafoil 42, and operating any other actuators or controls that may be available to the control system 18.

Figure 38:
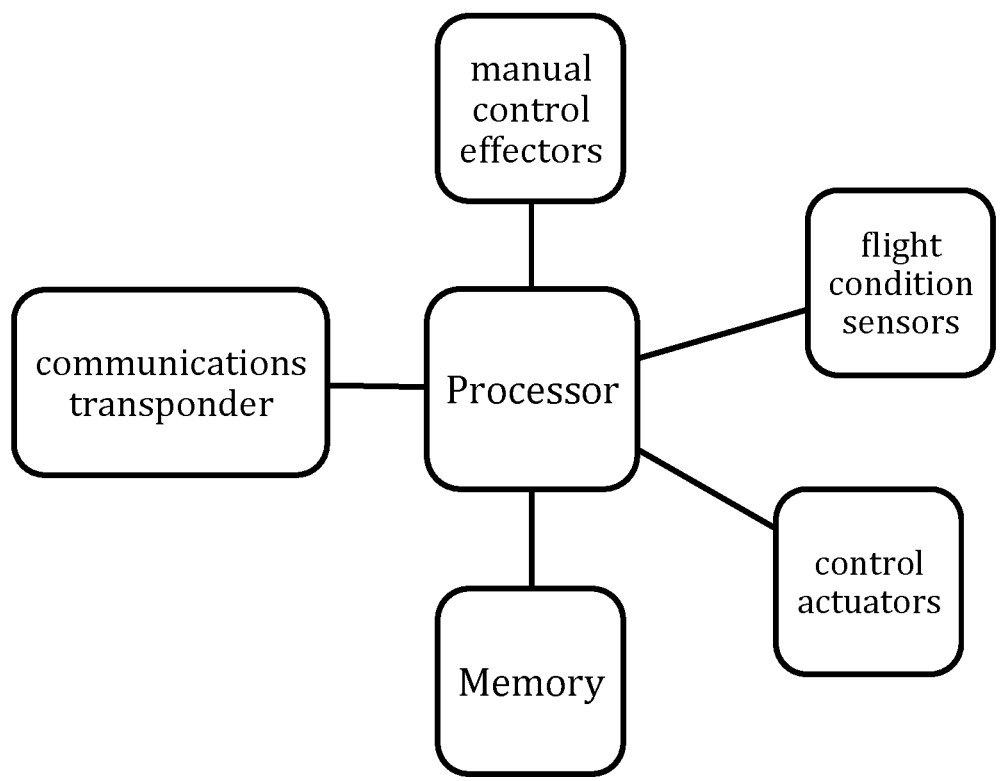
FIG. 38 is a schematic diagram of a mission module rescue apparatus control system.

FIG. 38 is a schematic diagram of a flight control automation package 50 that may be installed on a mission module 8 as part of a mission module self-rescue apparatus 25. The communications transponder transmits status and condition information of the mission module 8 to a remote operator and receives situational information and instructions from the remote operator. The manual control effectors provide instructions from a passenger in the mission module 8 to the processor. The flight condition sensors detect the flight condition of the mission module 8 as the mission module 8 is suspended from the parafoil 42. The flight condition sensors may include terrain and obstacle sensors to assist in selecting a landing location. The control actuators are the flight controls for the suspended mission module 8, and may include winches 70 acting on the shrouds 66 providing steering control for the parafoil 42 and may include center of gravity actuators 74 to move the center of gravity of the mission module 8 with respect to the center of lift of the parafoil 42. The control actuators also may include controls for a propulsion package 54. Where the mission module 8 has a power source such as a ground vehicle engine on board, the ground vehicle engine may be a part of the propulsion package under the control of the flight control automation package 50 and may operate a propeller 64.

LIST OF NUMBERED ELEMENTS

The following is a list of numbered elements from the specification and drawings and as used in the claims.
2 Self-rescue system
4 modular and morphable air vehicle.
6 flight module
8 mission module
10 central unit
12, 14 ducted fans
16 engine
18 flight module control system
20 rotor
22 ducts
24 aircraft self-rescue apparatus
25 mission module self-rescue apparatus
26 docking system
28 explosive bolts
30 attachment location of the self-rescue system
31 aircraft attachment mechanism
32 high capability self-rescue apparatus
33 mission module attachment mechanism
34 medium capability self-rescue apparatus
36 low capability self-rescue apparatus
38 parachute
40 rocket
42 parafoil
44 launch automation package
46 control effector package
48 transponder
50 flight control automation package
52 automation sensors
54 propulsion package
56 turbine engine
58 fuel supply
60 propulsion fans
62 control inceptor package
64 propeller
65 aileron package
66 shrouds
68 frame
70 winches
72 cables
74 center of gravity actuators
76 supplemental rockets
78 thrust
80 secondary parachute
82 trolley
84 track
86 auxiliary cables

What is claimed is:

1. A self-rescue system for an aircraft and a mission module, the mission module is selectably attachable to the aircraft and the aircraft is configured to support the mission module in flight, the self-rescue system comprising:
   a. a plurality of aircraft self-rescue apparatus, each of said plurality of aircraft self-rescue apparatus having a suite of capabilities different from each other of said plurality of aircraft self-rescue apparatus;
   b. an aircraft attachment mechanism, said aircraft attachment mechanism being configured to allow selectable and interchangeable attachment of any of said plurality of aircraft self-rescue apparatus to said aircraft;
   c. an aircraft self-rescue control system configured to control said aircraft self-rescue apparatus when said aircraft self-rescue apparatus is attached to the aircraft;
   d. a plurality of mission module self-rescue apparatus, each of said plurality of mission module self-rescue apparatus having a suite of capabilities different from each other of said plurality of mission module self-rescue apparatus;
   e. a mission module attachment mechanism, said mission module attachment mechanism being configured to allow interchangeable attachment of any of said plurality of mission module self-rescue apparatus to said mission module;

f. a mission module self-rescue control system configured to control said mission module self-rescue apparatus when said mission module self-rescue apparatus is attached to said mission module.

2. The self-rescue system of claim 1 wherein said plurality of aircraft self-rescue apparatus and said plurality of mission module self-rescue apparatus are interchangeable and each of said aircraft self-rescue apparatus and each of said mission module self-rescue apparatus is configured to be operably attached to said aircraft by said aircraft attachment mechanism and is configured to be operably attached to said mission module by said mission module attachment mechanism.

3. The self-rescue system of claim 1 wherein a first of said plurality of aircraft self-rescue apparatus comprises: a parachute and a second of said plurality of aircraft self-rescue apparatus comprises: a parafoil, said first and said second aircraft self-rescue apparatus being alternatively selectable by an operator of said aircraft consistent with a mission of said aircraft, said first and said second aircraft self-rescue apparatus being alternatively attachable to said aircraft by said operator using said attachment mechanism.

4. The self-rescue system of claim 3 wherein each of said plurality of aircraft self-rescue apparatus comprises: a launch mechanism for said parachute or said parafoil.

5. The self-rescue system of claim 3 wherein one or more of said plurality of aircraft self-rescue apparatus comprises: a mortar or rocket, said mortar or rocket being configured to launch said parachute or parafoil upon command by said aircraft self-rescue control system.

6. The self-rescue system of claim 3 wherein one or more of said plurality of said aircraft self-rescue apparatus comprises: a drogue parachute configured to launch said parachute or said parafoil upon command by said aircraft self-rescue control system, wherein each of said aircraft rescue apparatus and said attachment mechanism are configured to allow selection prior to flight of the aircraft by said operator of said aircraft self-rescue control apparatus having said drogue parachute or said aircraft self-rescue control apparatus having said mortar or rocket.

7. The self-rescue system of claim 3 wherein said parafoil includes a parafoil effector and wherein one or more of said plurality of said aircraft self-rescue apparatus comprises: a remote control module for control of said parafoil when said parafoil is deployed and is supporting the aircraft, said remote control module being configured to accept a parafoil control command from a remote operator and to execute said command by said control effector, and wherein one or more of said plurality of aircraft self-rescue apparatus does not comprise said remote control module, wherein each of said aircraft rescue apparatus and said attachment mechanism are configured to allow selection by said operator of said aircraft self-rescue apparatus having said parafoil and having said remote control module or said aircraft self-rescue apparatus having said parafoil and not having said remote control module.

8. The self-rescue system of claim 3 wherein a mission module configured to accommodate a passenger is selectably attachable to the aircraft and the aircraft is configured to support the mission module and passenger in flight and said parafoil includes a parafoil effector, said aircraft self-rescue apparatus comprises: a passenger control actuator for control of said parafoil effector by said passenger when said aircraft and said mission module are supported by said parafoil, said passenger control actuator being configured to accept a command from said passenger and to execute said command, and wherein one or more of said plurality of aircraft self-rescue apparatus does not comprise said passenger control actuator, wherein each of said aircraft rescue apparatus and said attachment mechanism are configured to allow selection before flight by said operator of said aircraft self-rescue apparatus having said parafoil and having said passenger control actuator or said aircraft self-rescue apparatus having said parafoil and not having said passenger control actuator.

9. The self-rescue system of claim 3 wherein a one of said plurality of said aircraft self-rescue apparatus includes said parafoil and also includes a flight control automation package, said flight control automation package comprising: a flight condition sensor and a navigation sensor, said flight condition sensor and said navigation sensor being configured for communication with said aircraft self-rescue control system, said aircraft self-rescue control system being informed by said flight condition and navigation sensors, said aircraft self-rescue control system being configured to control a parafoil effector to autonomously control said parafoil in flight when said parafoil is deployed and the aircraft is supported by said parafoil, and wherein a one of said plurality of aircraft self-rescue apparatus does not include said flight automation package, wherein each of said aircraft rescue apparatus and said attachment mechanism are configured to allow selection before flight by said operator of said aircraft self-rescue apparatus having said parafoil and having said flight control automation package or said aircraft self-rescue apparatus having said parafoil and not having said flight control automation package.

10. The self-rescue system of claim 3 wherein a one of said plurality of said aircraft self-rescue apparatus includes said parafoil and also includes a propulsion package, said propulsion package comprising: an engine, said engine being configured to propel said aircraft when said parafoil aircraft is deployed and supporting said aircraft, and wherein a one of said plurality of aircraft self-rescue apparatus includes said parafoil and does not include said propulsion package, wherein each of said aircraft rescue apparatus and said attachment mechanism are configured to allow selection before flight by said operator of said aircraft self-rescue apparatus having said parafoil and having said propulsion package or said aircraft self-rescue apparatus having said parafoil and not having said propulsion package.

11. The self-rescue system of claim 3 wherein a one of said plurality of said aircraft self-rescue apparatus includes said parafoil and also includes an aileron package, said aileron package being configured to be a control effector for said parafoil when said parafoil is deployed and supporting said aircraft, and wherein a one of said plurality of aircraft self-rescue apparatus includes said parafoil an does not include said aileron package, wherein each of said aircraft rescue apparatus and said attachment mechanism are configured to allow selection before flight by said operator of said aircraft self-rescue apparatus having said parafoil and having said aileron package or said aircraft self-rescue apparatus having said parafoil and not having said aileron package.

12. The self-rescue system of claim 1 wherein said aircraft self-rescue apparatus is modular and is composed of a plurality of sub-modules, each said sub-module is configured to be independently selectable by an operator of the aircraft prior to flight.

13. The self-rescue system of claim 12 wherein each of said sub-modules is selectably attachable to the aircraft at a single location on the aircraft.

14. The self-rescue system of claim 12 wherein said sub-modules are attachable to the aircraft at a plurality of locations on the aircraft.

15. The self-rescue system of claim 12 wherein a one of said plurality of sub-modules is a parachute.

16. The self-rescue system of claim 15 wherein a one of said plurality of sub-modules is a parafoil.

17. The self-rescue system of claim 16 wherein a one of said sub-modules is a drogue parachute configured to deploy said parachute or said parafoil.

18. The self-rescue system of claim 16 wherein a one of said sub-modules is a mortar or rocket configured to deploy said parachute or said parafoil.

19. The self-rescue system of claim 18 wherein a one of said sub-modules is a launch automation system, said launch automation system including an attitude sensor for the aircraft and an aiming system configured to aim said mortar or rocket based on a detected attitude of the aircraft as detected by said attitude sensor.

20. A self-rescue system for an aircraft, the self-rescue system comprising:
    a. a plurality of aircraft self-rescue apparatus, each of said plurality of aircraft self-rescue apparatus having a suite of capabilities different from each other of said plurality of aircraft self-rescue apparatus, a first of said plurality of aircraft self-rescue apparatus comprising: a parachute and a second of said plurality of self-rescue apparatus comprising: a parafoil, said first and said second self-rescue apparatus being alternatively selectable by an operator of said aircraft consistent with a mission of said aircraft;
    b. an aircraft attachment mechanism, said aircraft attachment mechanism being configured to allow selectable and interchangeable attachment of any of said plurality of aircraft self-rescue apparatus to said aircraft, said first and said second self-rescue apparatus being alternatively attachable to said aircraft by said operator using said attachment mechanism;
    c. a mortar or rocket configured to launch said parachute or parafoil;
    d. an aircraft self-rescue control system configured to control said self-rescue apparatus when said aircraft self-rescue apparatus is attached to the aircraft, said aircraft self-rescue control system being configured to command said mortar or rocket to launch said parachute or parafoil;
    e. a launch automation system, said launch automation system including an attitude sensor configured to detect an attitude of the aircraft, said launch automation system including a mortar or rocket aiming system configured to aim said mortar or said rocket based on said attitude of the aircraft detected by said attitude sensor, and wherein one or more of said plurality of aircraft self-rescue apparatus that comprises said mortar or rocket does not comprise said launch automation system, wherein each of said aircraft rescue apparatus and said attachment mechanism are configured to allow selection by said operator of said aircraft of said aircraft self-rescue apparatus having said launch automation system or said aircraft self-rescue apparatus not having said launch automation system.

21. A method of operating a self-rescue system for an aircraft, the method comprising:
    a. providing a plurality of aircraft self-rescue apparatus, each of the plurality of aircraft self-rescue apparatus having a suite of capabilities different from each other of the plurality of aircraft self-rescue apparatus;
    b. providing an aircraft attachment mechanism, the aircraft attachment mechanism being configured to allow selectable and interchangeable attachment of each of said plurality of aircraft self-rescue apparatus to the aircraft;
    c. receiving a mission assignment by an operator of the aircraft;
    d. selecting by the operator of a one of the plurality of aircraft self-rescue apparatus based on the mission assignment;
    e. attaching the selected one of the plurality of aircraft self-rescue apparatus to the aircraft;
    f. flying the mission by the aircraft, wherein a mission module is selectably attachable to the aircraft and the aircraft is configured to support the mission module in flight, the method further comprising:
    g. providing a plurality of mission module self-rescue apparatus, each of the plurality of mission module self-rescue apparatus having a suite of capabilities different from each other of the plurality of mission module self-rescue apparatus;
    h. providing a mission module attachment mechanism, the mission module attachment mechanism being configured to allow interchangeable attachment of any of the plurality of mission module self-rescue apparatus to the mission module;
    i. selecting by the operator of a one of the plurality of mission module self-rescue apparatus based on the mission assignment;
    e. attaching the selected one of the plurality of mission module self-rescue apparatus to the mission module;
    j. attaching the mission module to the aircraft, and wherein the step of flying the mission by the aircraft further comprises: flying the mission by the combination of the aircraft and the attached mission module.

22. The method of claim 21 wherein the plurality of aircraft self-rescue apparatus are interchangeable with the plurality of mission module self-rescue apparatus, the steps of selecting and attaching the one of the plurality of aircraft self-rescue apparatus further comprising:
    a. selecting by the operator of a mission module self-rescue apparatus or an aircraft mission module self-rescue apparatus, based on the assigned mission; and
    b. attaching the selected mission module self-rescue apparatus or aircraft self-rescue apparatus to the mission module.

23. The method of claim 21 wherein each of the plurality of aircraft self-rescue apparatus is modular and is composed of a plurality of submodules, the step of selecting by the operator of the one of the plurality of aircraft self-rescue apparatus based on the mission assignment comprising: selecting among the plurality of submodules.

* * * * *